(12) United States Patent
Yu et al.

(10) Patent No.: US 10,746,923 B2
(45) Date of Patent: Aug. 18, 2020

(54) PHOTONIC SEMICONDUCTOR DEVICE AND METHOD

(71) Applicant: Taiwan Semiconductor Manufacturing Company, Ltd., Hsinchu (TW)

(72) Inventors: Chen-Hua Yu, Hsinchu (TW); Hsing-Kuo Hsia, Jhubei (TW); Kuo-Chiang Ting, Hsinchu (TW); Pin-Tso Lin, Hsinchu (TW); Sung-Hui Huang, Dongshan Township (TW); Shang-Yun Hou, Jubei (TW); Chi-Hsi Wu, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 0 days.

(21) Appl. No.: 16/450,725

(22) Filed: Jun. 24, 2019

(65) Prior Publication Data
US 2020/0003950 A1 Jan. 2, 2020

Related U.S. Application Data

(60) Provisional application No. 62/690,760, filed on Jun. 27, 2018.

(51) Int. Cl.
*G02B 6/12* (2006.01)
*G02B 6/124* (2006.01)
*G02B 6/136* (2006.01)
*G02B 6/122* (2006.01)

(52) U.S. Cl.
CPC ......... *G02B 6/12004* (2013.01); *G02B 6/124* (2013.01); *G02B 6/1228* (2013.01); *G02B 6/136* (2013.01); *G02B 2006/12061* (2013.01); *G02B 2006/12107* (2013.01); *G02B 2006/12142* (2013.01)

(58) Field of Classification Search
CPC .... G02B 6/12004; G02B 6/124; G02B 6/136; G02B 6/1228; G02B 2006/12061; G02B 2006/12142; G02B 2006/12107
See application file for complete search history.

(56) References Cited

U.S. PATENT DOCUMENTS

| 9,817,185 | B2 * | 11/2017 | Sacher | ............... G02B 6/12002 |
| 2017/0212304 | A1 * | 7/2017 | Sacher | .................. G02B 6/122 |
| 2020/0003950 | A1 * | 1/2020 | Yu | .......................... G02B 6/124 |

* cited by examiner

*Primary Examiner* — Andrew Jordan
(74) *Attorney, Agent, or Firm* — Slater Matsil, LLP

(57) ABSTRACT

A method includes forming silicon waveguide sections in a first oxide layer over a substrate, the first oxide layer disposed on the substrate, forming a routing structure over the first oxide layer, the routing structure including one or more insulating layers and one or more conductive features in the one or more insulating layers, recessing regions of the routing structure, forming nitride waveguide sections in the recessed regions of the routing structure, wherein the nitride waveguide sections extend over the silicon waveguide sections, forming a second oxide layer over the nitride waveguide sections, and attaching semiconductor dies to the routing structure, the dies electrically connected to the conductive features.

20 Claims, 31 Drawing Sheets

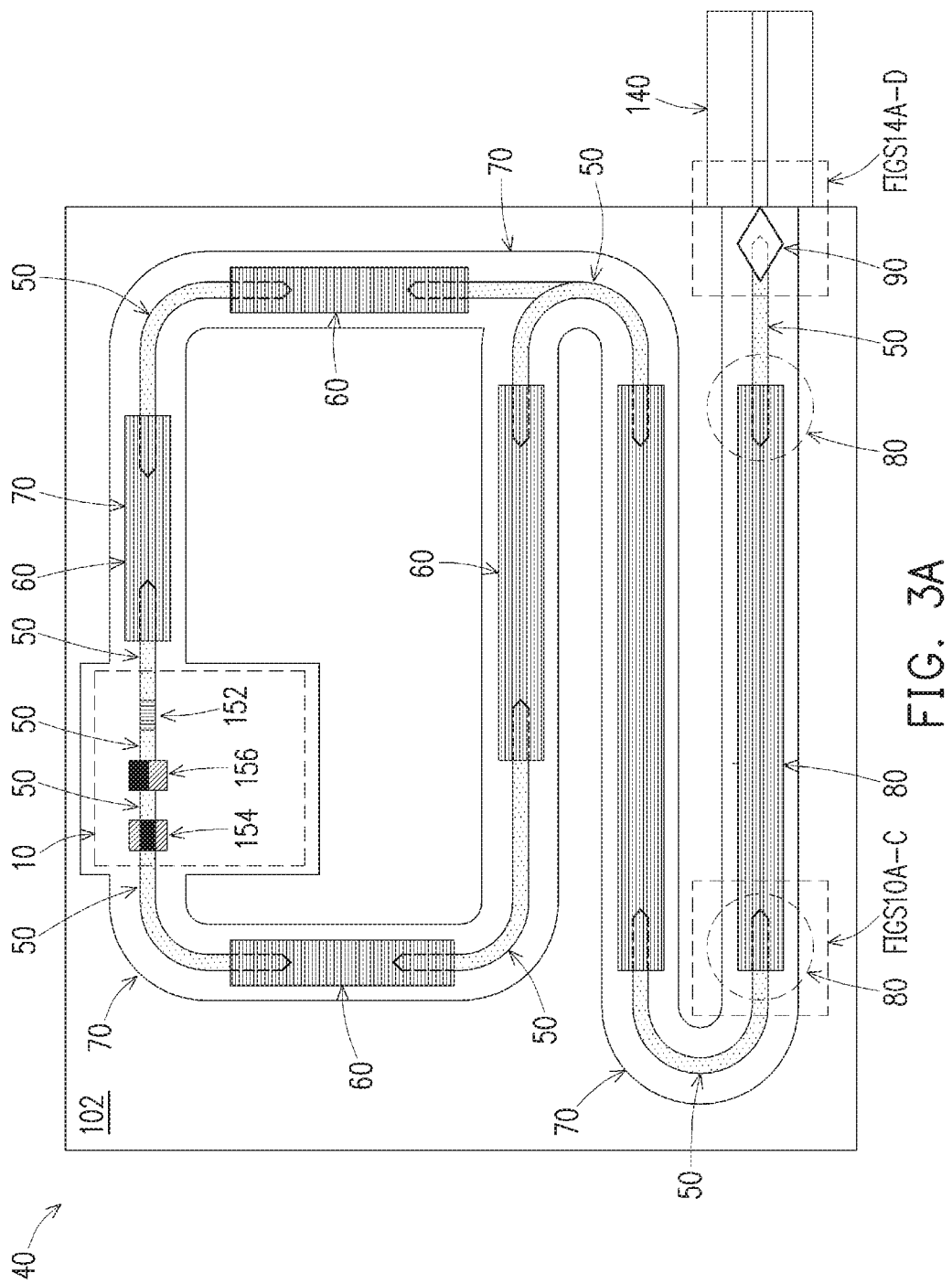

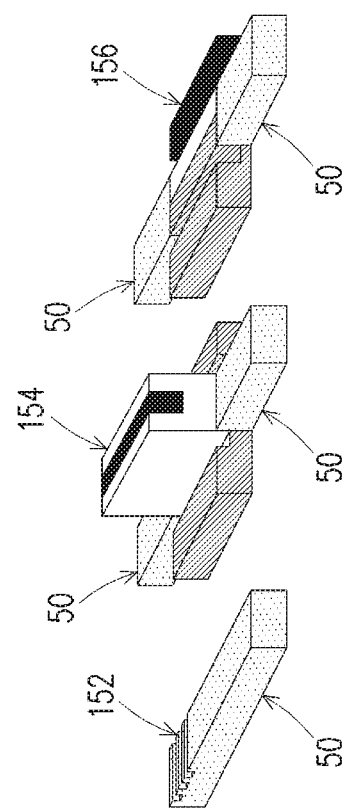
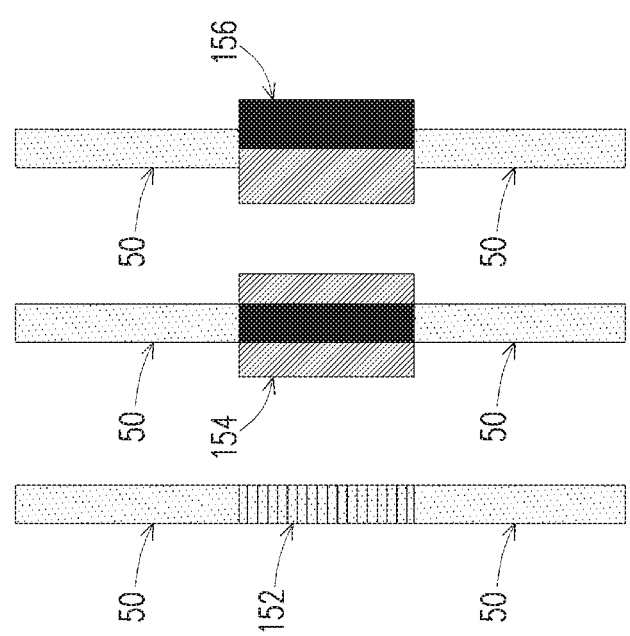
FIG. 3C
FIG. 3B

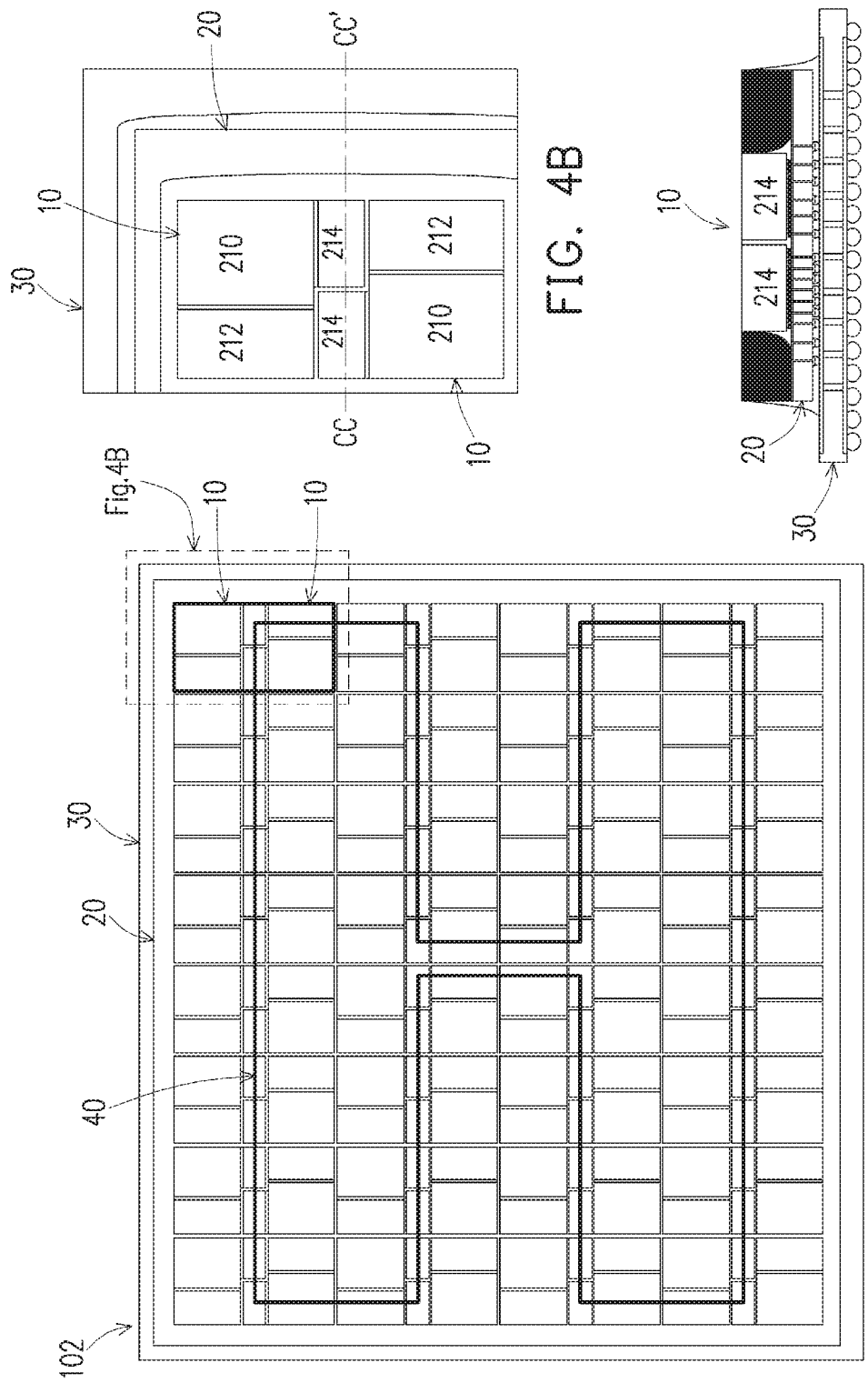

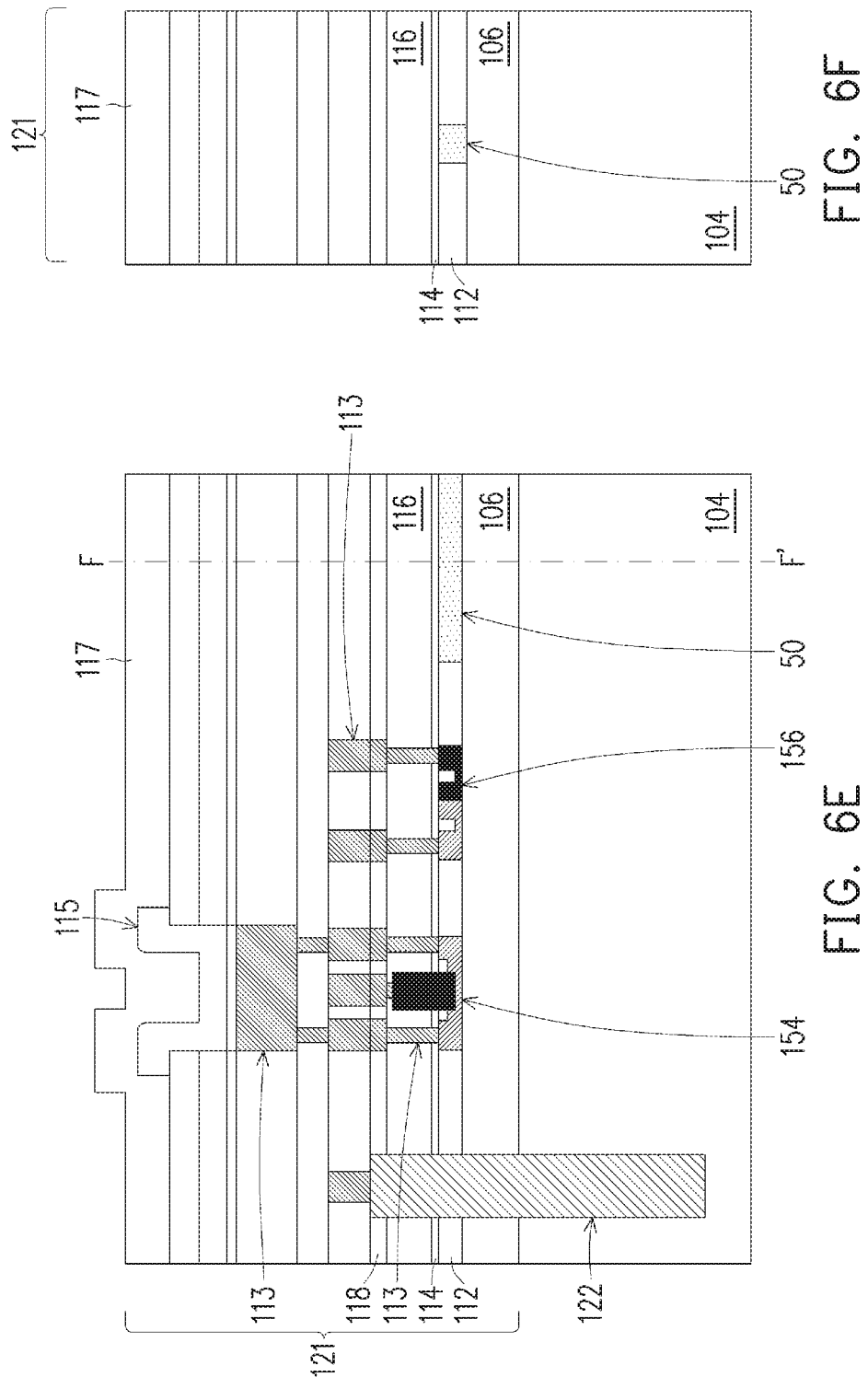

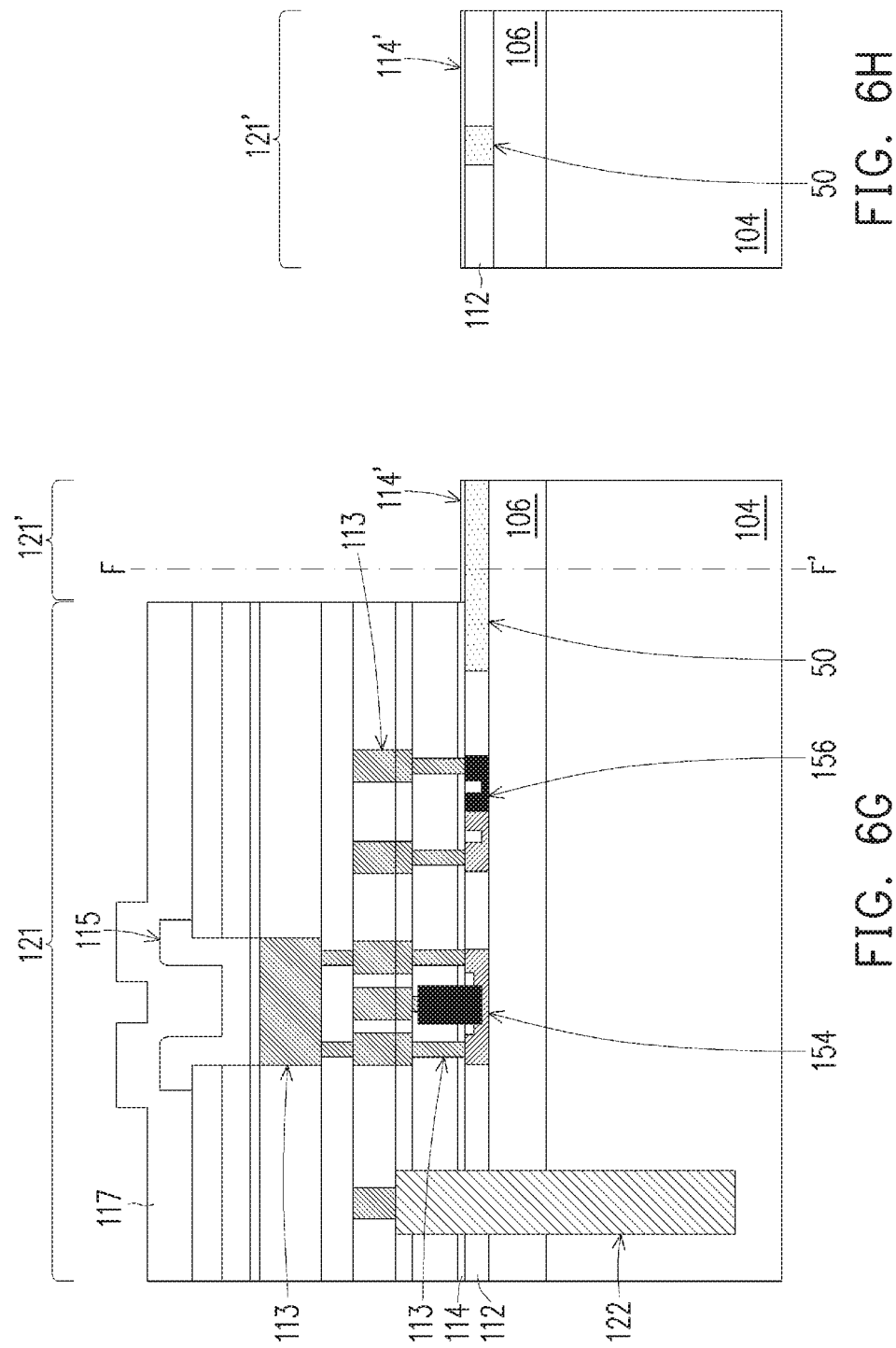

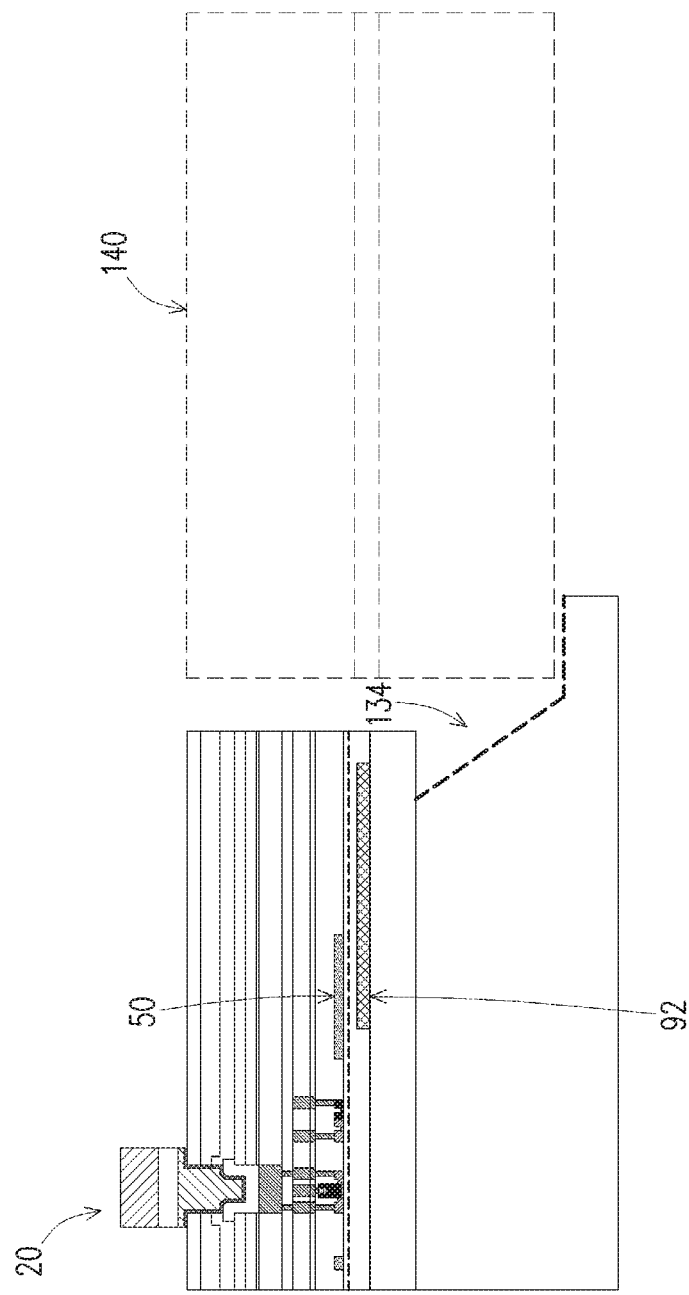

US 10,746,923 B2

PHOTONIC SEMICONDUCTOR DEVICE AND METHOD

PRIORITY CLAIM AND CROSS-REFERENCE

This application claims the benefit of U.S. Provisional Application No. 62/690,760, filed on Jun. 27, 2018, which application is hereby incorporated herein by reference.

BACKGROUND

Electrical signaling and processing are one technique for signal transmission and processing. Optical signaling and processing have been used in increasingly more applications in recent years, particularly due to the use of optical fiber-related applications for signal transmission.

Optical signaling and processing are typically combined with electrical signaling and processing to provide full-fledged applications. For example, optical fibers may be used for long-range signal transmission, and electrical signals may be used for short-range signal transmission as well as processing and controlling. Accordingly, devices integrating optical components and electrical components are formed for the conversion between optical signals and electrical signals, as well as the processing of optical signals and electrical signals. Packages thus may include both optical (photonic) dies including optical devices and electronic dies including electronic devices.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 3A-3C illustrates a schematics of the optical network and photonic devices of a hybrid photonic system, in accordance with some embodiments.

FIGS. 4A-4C and FIG. 5 illustrate a plan view and a cross-sectional view of a photonic system, in accordance with some embodiments.

FIGS. 6A-6H illustrate cross-sectional views of intermediate steps during a process for forming an integrated photonic structure, in accordance with some embodiments.

FIGS. 17-19 illustrate cross-sectional views of intermediate steps during a process for forming an integrated photonic structure, in accordance with some embodiments.

DETAILED DESCRIPTION

Figure 1:
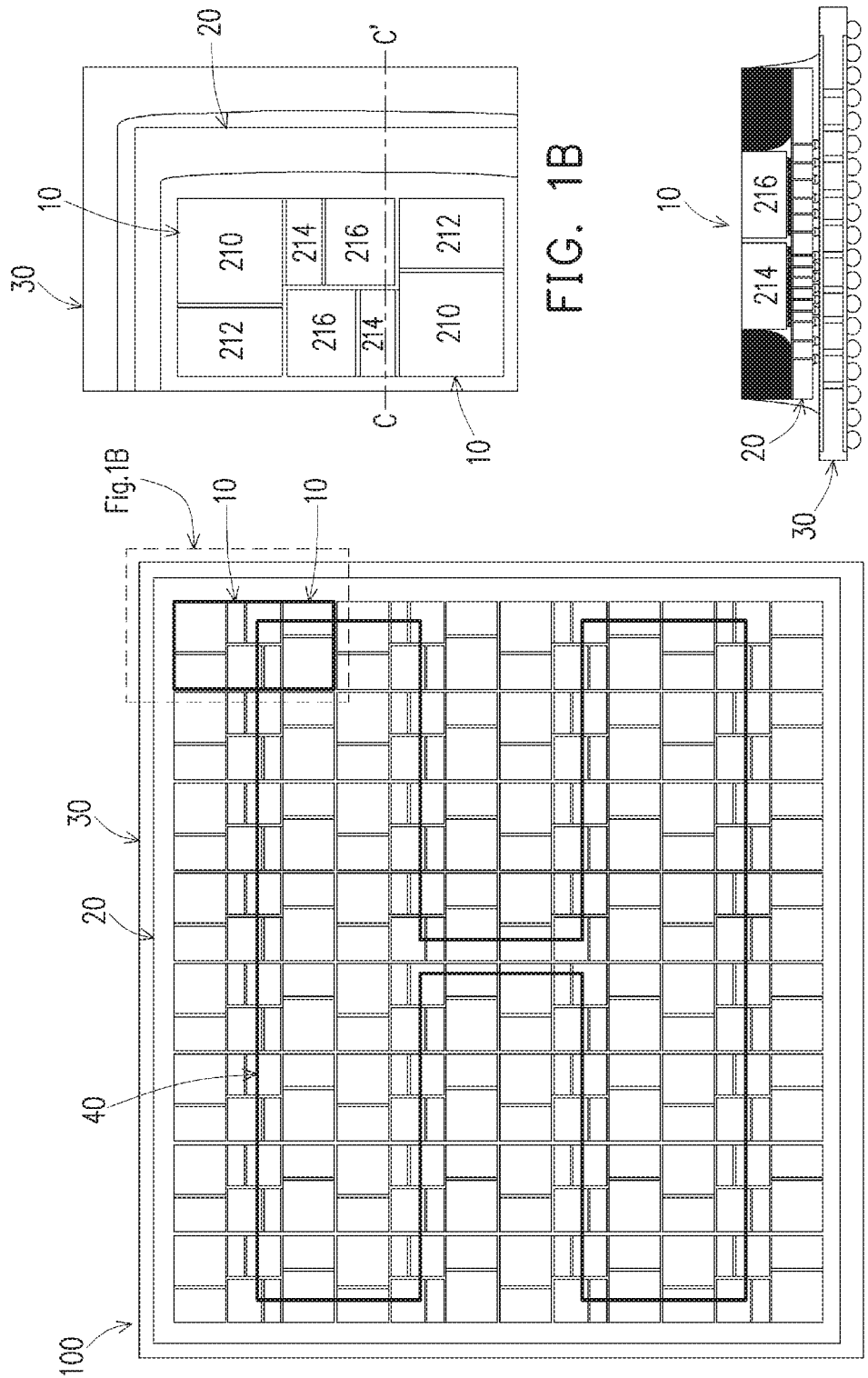
FIGS. 1A-1C and FIG. 2 illustrate a plan view and a cross-sectional view of a photonic system, in accordance with some embodiments.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Photonic systems including both optical devices and electrical devices, and the method of forming the same are provided, in accordance with some embodiments. In particular, a photonic system is formed having an optical network that includes silicon waveguides coupled to silicon nitride waveguides. The silicon nitride waveguides have a lower signal propagation loss than the silicon waveguides, and as such are used to transmit optical signals over relatively longer distances. A cladding may be formed over the waveguides to reduce leakage of optical signal into the substrate. In some embodiments, the silicon nitride waveguides are formed in a layer over the silicon waveguides. In some embodiments, the silicon waveguides are formed in a first structure and the silicon nitride waveguides are formed in a second structure, and then the structures are bonded together. By forming the silicon nitride waveguides in a separate structure than the silicon waveguides, the silicon nitride waveguides may be formed using techniques which improve the performance of the silicon nitride waveguides. Intermediate stages of forming the photonic systems are illustrated, in accordance with some embodiments. Some variations of some embodiments are discussed. Throughout the various views and illustrative embodiments, like reference numbers are used to designate like elements.

FIGS. 1A-1C illustrate a photonics system 100 in accordance with some embodiments. The photonics system 100 may be, e.g., a high performance computing (HPC) system, and includes multiple sites 10, each of which may be a separate computing system. FIG. 1A shows a planview of a photonics system 100 including multiple sites 10. FIG. 1B shows a close-up of two adjacent sites 10 as indicated in FIG. 1A, and FIG. 1C shows a cross-sectional view through cross-section C-C' as indicated in FIG. 1B. Each site 10 includes one or more dies (e.g., dies 210, 212, 214, or 216, described in greater detail below) coupled to an integrated photonic structure (IPS) 20. The IPS 20 may be attached to an interconnect substrate 30, as shown in FIGS. 1A-1C.

Each site 10 communicates with other sites 10 using one or more optical networks 40 formed in the IPS 20. The optical network 40 formed in the IPS 20 may comprise waveguides and other photonic components. In some embodiments, the optical network 40 may comprise silicon (Si) waveguides and silicon nitride (SiN) waveguides, such as silicon waveguides 50 or nitride waveguides 60, described in greater detail below in FIG. 5. In some embodiments, the optical network 40 is a closed loop (or ring) that connects to each site 10 of the photonics system 100, as shown in FIG. 1A. In some embodiments, the optical network 40 may not be a closed loop, may have branching sections, or may include separated sections. In an embodiment, the optical network 40 includes multiple waveguides connecting the sites 10 in a peer-to-peer manner. The optical network 40 may carry optical signals and/or optical power between sites 10. In some embodiments, the optical network 40 may also carry optical signals and/or optical power between the IPS 20 and external components. For example, the optical network 40 may be coupled to external components via one or more optical fibers.

Each site 10 of the photonics system 100 may include one or more dies, which may include processor dies 210, memory dies 212, electronic integrated circuits (EIC) 214, photonic integrated circuits (PIC) 216, the like, or a combination thereof. For example, each site 10 shown in FIGS. 1A-1C includes a processor die 210, a memory die 212, an EIC 214, and a PIC 216, though sites 10 may include more than one of each type of die, or other types of die. The processor die 210 may include, for example, a central processing unit (CPU), graphics processing unit (GPU), application-specific integrated circuit (ASIC), or the like. The memory die 212 may include, for example, volatile memory, dynamic random-access memory (DRAM), static random-access memory (SRAM), or the like. In some cases, a site 10 may include processor dies 210 that also include memory. In such cases, a separate memory die 212 may not be present within the site 10.

In some embodiments, the EIC die 214 may include a controlling circuit for controlling the operation of the photonic devices associated with the site 10. The photonic devices may be, for example, photonic devices formed in the PIC 216 and/or photonic devices formed in the IPS 20 (see FIGS. 6B-6C). The EIC die 214 may also include a CPU, in some embodiments. The EIC die 214 may communicate with photonic devices of the PIC 216 or IPS 20 using electrical signals. In some embodiments, the EIC 214 includes the circuits for processing electrical signals received from photonic devices, such as electrical signals received from a photodetector of the PIC 216 or a photodetector within the IPS 20. For example, the EIC 214 may include controllers, transimpedance amplifiers, and the like. The EIC 214 may be communicatively coupled to one or more processor dies 210. In some cases, the EIC 214 is configured to control high-frequency signaling of a photonic device according to electrical signals (digital or analog) received from a processor die 210. In some embodiments, functions of an EIC 214 may be part of a processor die 210, or functions of a processor die 210 may be part of an EIC 214, or a processor die 210 and an EIC 214 may be combined together as a single die.

The PIC 216 includes photonic devices (not independently shown in FIGS. 1A-1C) that interact with, control, or sense the optical signals transmitted through the optical network 40. These photonic devices may include devices such as optical modulators, photodetectors, grating couplers, light-emitting diodes or lasers, the like, or combinations thereof. For example, the PIC 216 may include a grating coupler that couples optical signals from the optical network 40 to a photodetector within the PIC 216. Additionally, integrated electronic devices such as transistors, diodes, capacitors, resistors, metal routing, and the like may also be formed within the PIC 216, and may be coupled to the photonic devices within the PIC 216.

In some embodiments, the interconnect substrate 30 may be for example, a glass substrate, ceramic, a dielectric substrate, an organic substrate (e.g., an organic core), a semiconductor substrate (e.g., a semiconductor wafer), or the like. The interconnect substrate 30 may be electrically connected to the IPS 20 by electrical connectors (e.g., solder bumps or the like). The interconnect substrate 30 may include through-substrate-vias (TSVs), metallization layers, passive or active devices, or the like. In some embodiments, the interconnect substrate 30 may not be present. In this manner, the photonic system 100 may be a System-on-Wafer (SoW), a Chip-on-System-on-Wafer (CoWoS), or the like. In some embodiments, the interconnect substrate 30 may be another type of structure, such as an integrated fan-out structure, a redistribution structure, or the like.

Figure 2:
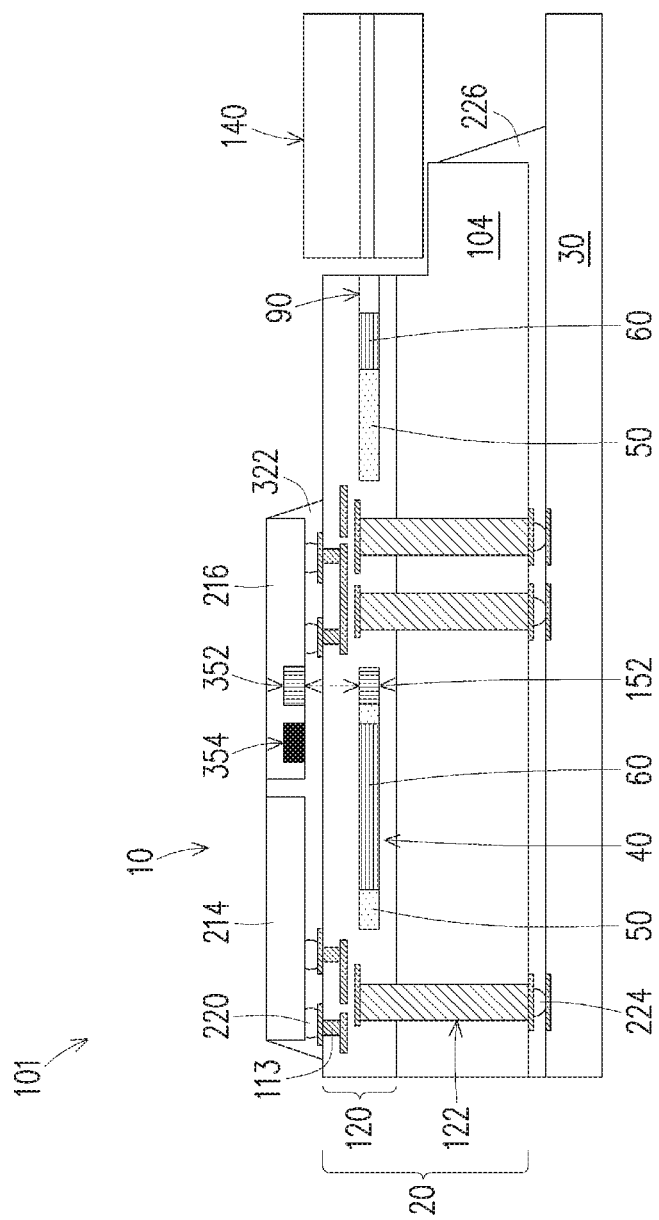

Turning to FIG. 2, a cross sectional view of a portion of photonics system 101 is shown, in accordance with an embodiment. The photonics system 101 shown in FIG. 2 may be similar to the photonics system 100 shown in FIGS. 1A-1C. For example, the photonics system 101 includes an IPS 20, which may be similar to that shown in FIGS. 1A-1C. The photonics system 101 includes multiple sites 10 comprising one or more dies. The site 10 shown in FIG. 2 includes an EIC 214 and a PIC 216, though sites 10 of the photonics system 101 may include other dies, as described above with respect to FIGS. 1A-1C. The dies are electrically connected to the IPS 20 by conductive connectors 220 (e.g., solder bumps or the like). In some embodiments, an underfill 322 may extend between the dies (e.g., 214/216) and the IPS 20. The underfill 322 may be transparent or relatively transparent to optical wavelengths associated with photonic components and/or the optical network 40 of the photonics system 101. The IPS 20 is electrically connected to the interconnect substrate 30 by vias 122 or electrical connectors 224 (e.g., solder bumps or the like). An underfill 226 may extend between the IPS 20 and the interconnect substrate 30, in some embodiments.

Still referring to FIG. 2, the IPS 20 includes a routing structure 120 formed on a substrate 104. The routing structure 120 comprises one or more layers and includes components of the optical network 40 (e.g., waveguides, or other photonic components described below) and may include electrical routing (e.g., conductive features 113, see FIGS. 6G-6H) or other electrical components. The electrical routing provides electrical connection between components of the photonic system 101 (e.g., sites 10, dies 214/216/etc., the interconnect substrate 30, etc.), and may transmit electrical signals or electrical power between components. The optical network 40 allows sites 10 to communicate using optical signals, as described previously. The optical network 40 may include one or more edge couplers 90 that couple optical signals between the optical network 40 and an optical fiber 140. In this manner, the optical network 40 may communicate with external components through one or more optical fibers 140.

Still referring to FIG. 2, the optical network 40 may communicate with the PIC 216 using optical signals. For example, the optical network 40 may include a grating coupler 152 that directs an optical signal toward the PIC 216. The PIC 216 may include a coupler 352 (e.g., a grating coupler) that receives the optical signal from the optical network and couples the optical signal into photonic components of the PIC 216, such as a photodetector 354. In some embodiments, the PIC 216 may direct an optical signal toward a grating coupler 152 of the optical network 40. The PIC 216 may provide the optical signal using, for example, a modulated LED or laser signal.

In some embodiments, the optical network 40 within the routing structure 120 may include waveguides formed from different materials. For example, the optical network 40 may include waveguides formed from silicon (silicon waveguides 50) and waveguides formed from silicon nitride (nitride waveguides 60). In this manner, the optical network 40 may be considered a "hybrid waveguide" network. The use of a hybrid waveguide network (e.g. optical network 40) as described here can allow for more efficient transmission of optical signals between sites 10, described in greater detail below. The silicon waveguides 50 or nitride waveguides 60 may be, for example, slab waveguides.

Turning to FIGS. 3A-3C, a schematic illustration of an optical network 40 including both silicon waveguides 50 and nitride waveguides 60 is shown, in accordance with some embodiments. FIG. 3A shows an optical network 40 in a plan view, and some features are omitted or shown as transparent for clarity. FIGS. 3B-3C show photonic components that may be integrated with the silicon waveguides 50 of the optical network 40. In the optical network 40, the silicon waveguides 50 or nitride waveguides 60 may be covered in a cladding 70 in some embodiments, which may reduce propagation loss or light leakage. The cladding 70 may be formed from a dielectric material such as silicon dioxide ($SiO_2$), and may have surfaces exposed to air (see FIGS. 10A-10D). Some portions of the optical network 40 may not be covered by the cladding 70. For example, in regions of the optical network 40 over which dies (e.g., 210, 212, 214, 216) are placed, the dielectric material may not be formed into cladding 70. An example region without cladding 70 is shown in FIG. 3A around the site 10. The optical network 40 shown in FIG. 3A is an illustrative example, and optical networks may have different configurations in other embodiments.

In some cases, a waveguide formed from silicon nitride (e.g., nitride waveguides 60) may have advantages over a waveguide formed from Si (e.g., silicon waveguides 50). For example, silicon nitride has a higher dielectric constant than silicon, and thus a nitride waveguide 60 may have a greater internal confinement of light than a silicon waveguide 50. This may also allow the performance or leakage of nitride waveguides 60 to be less sensitive to process variations, less sensitive to dimensional uniformity, and less sensitive to surface roughness (e.g., edge roughness or linewidth roughness). In some cases, the reduced process sensitivity may allow nitride waveguides 60 to be easier or less costly to process than silicon waveguides 50. These characteristics may allow a nitride waveguide 60 to have a lower propagation loss than a silicon waveguide 50. In some cases, the propagation loss (dB/cm) of a nitride waveguide 60 may be between about 0.1% and about 50% of a silicon waveguide 50. In some cases, a nitride waveguide 60 may also be less sensitive to the temperature of the environment than a silicon waveguide 50. For example, a nitride waveguide 60 may have a sensitivity to temperature that is as small as about 1% of that of a silicon waveguide 50.

The optical network 40 shown in FIG. 3A utilizes both nitride waveguides 60 and silicon waveguides 50 that are coupled together at mode converters 80. The mode converters 80 allow optical signals transmitted in a silicon waveguide 50 to be coupled into a nitride waveguide 60, and vice versa. Due to the smaller propagation loss of nitride waveguides 60, the optical network 40 uses nitride waveguides 60 for transmitting signals over relatively longer distances. In this manner, more of the optical signal strength may be preserved during transmission. In some embodiments, a nitride waveguide 60 may have a length between about 50 μm and about 1000 μm. For some curved sections of the optical network 40, the optical network 40 uses silicon waveguides 50, as the silicon waveguides 50 may have a smaller bending radius than the nitride waveguides 60 (due to the difference in dielectric constant between silicon and silicon nitride).

As shown in FIGS. 3A-3C, the optical network 40 may include photonic components such as photodetectors 154, modulators 156, grating couplers 152, or other components. An example site 10 is shown in FIG. 3A which may include dies (e.g., 210, 212, 214, 216) that are electrically connected to the photonic components or optically coupled to the photonic components. FIG. 3A shows a single site 10, but multiple dies or sites 10 may be coupled to multiple sets of photonic components of the optical network 40. FIG. 3B shows a plan view of a grating coupler 152, a photodetector 154, and a modulator 156 that are optically coupled to silicon waveguides 50, and FIG. 3C shows a perspective view of a grating coupler 152, a photodetector 154, and a modulator 156 that are optically coupled to silicon waveguides 50. The photonic components may be integrated with the silicon waveguides 50, and may be formed with the silicon waveguides 50. FIGS. 6A-6D illustrate cross-sectional views of the photodetector 154 and the modulator 156. The photonic components may be optically coupled to the silicon waveguides 50 to interact with optical signals within the silicon waveguides 50. For example, a grating coupler may be optically coupled to a silicon waveguide 50 to externally transmit the optical signal within the silicon waveguide, a photodetector 152 may be optically coupled to a silicon waveguide 50 to detect optical signals within the silicon waveguide 50, and a modulator 156 may be optically coupled to a silicon waveguide 50 to generate optical signals within the silicon waveguide 50. In this manner, the use of a hybrid optical network such as the optical network 40 may have improved transmission of optical signals over longer distances allowed by nitride waveguides 60 while also having the smaller bending radius and integrated photonic components allowed by silicon waveguides 50.

Turning to FIGS. 4A-4C, a photonics system 102 is shown, in accordance with some embodiments. The photonics system 102 may be, e.g., a high performance computing (HPC) system, and includes multiple sites 10, each of which may be a separate computing system. FIG. 4A shows a plan view of a photonics system 102 including multiple sites 10. FIG. 4B shows a close-up of two adjacent sites 10 as indicated in FIG. 4A, and FIG. 4C shows a cross-sectional view through cross-section C-C' as indicated in FIG. 4B. Each site 10 includes one or more dies (e.g., dies 210, 212, or 214) coupled to an integrated photonic structure (IPS) 20. The IPS 20 may be attached to an interconnect substrate 30, as shown in FIGS. 4A-4C.

The photonics system 102 is similar to the photonics system 100 shown in FIGS. 1A-1C, except that the photonics system 102 of FIGS. 4A-4C does not include PICs 216. In the photonics system 102, the photonic components (e.g., photodetectors, modulators, etc.) associated with each site 10 are formed in the IPS 20 and electrically connected to the dies 212/214. (A process flow for forming photonic components in the IPS 20 is described below in FIGS. 6A-6E, in accordance with some embodiments.) The photonic components may be electrically connected to and controlled by, e.g., an EIC 214. By forming the photonic components in the IPS 20, fewer dies are used in each site 10, which can reduce cost, number of components, and also the size of a photonics system. Additionally, less optical signal strength may be lost due to transmission between the optical network 40 and a PIC 216, which can reduce the power used by a photonics system.

Figure 5:
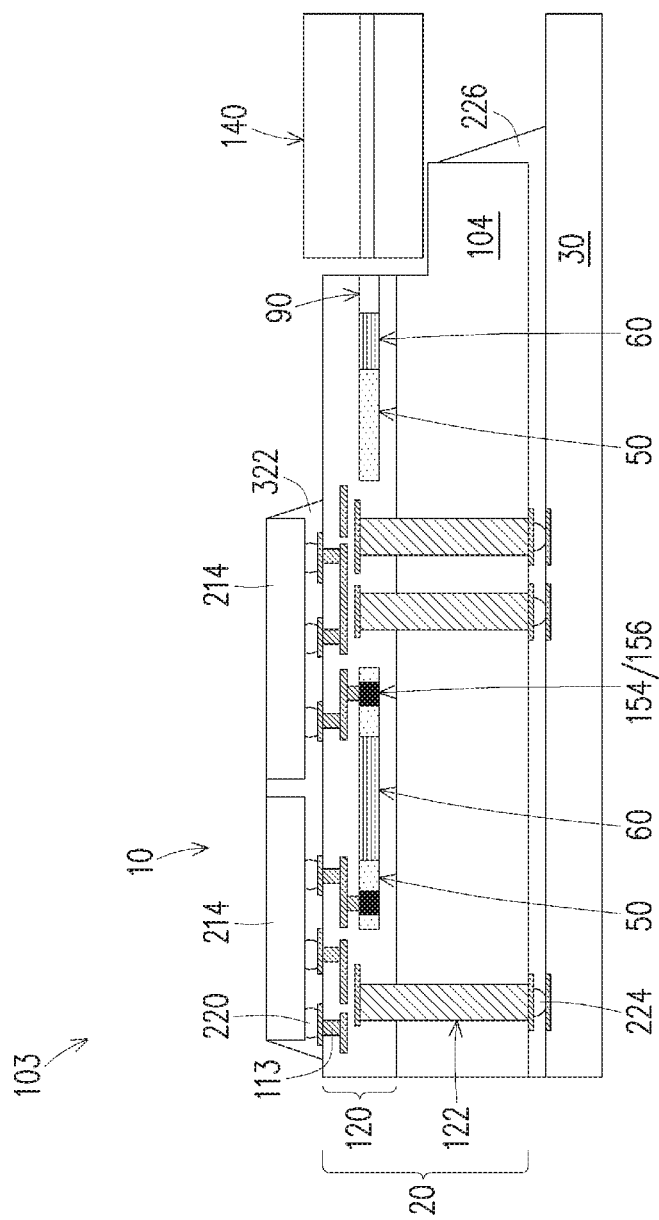

Turning to FIG. 5, a cross-sectional view of a portion of a photonics system 103 is shown, in accordance with some embodiments. The photonics system 103 shown in FIG. 5 may be similar to the photonics system 102 shown in FIGS. 4A-4C. For example, the photonics system 103 does not include PICs 216. The photonics system 103 includes multiple sites 10 comprising one or more dies. The sites 10 shown in FIG. 5 include two EICs 214, though sites 10 may include other dies, as described above with respect to FIGS. 1A-4C. The dies are electrically connected to the IPS 20 by conductive connectors 220 (e.g., solder bumps or the like). In some embodiments, an underfill 322 may extend between the dies (e.g., 214/216) and the IPS 20. The underfill 322 may be transparent or relatively transparent to optical wavelengths associated with photonic components and/or the optical network 40 of the photonics system 103. The IPS 20 is electrically connected to the interconnect substrate 30 by vias 122 or electrical connectors 224 (e.g., solder bumps or the like). An underfill 226 may extend between the IPS 20 and the interconnect substrate 30, in some embodiments.

Still referring to FIG. 5, the IPS 20 includes a routing structure 120 formed on a substrate 104. The routing structure 120 comprises one or more layers and includes components of the optical network 40 (e.g., waveguides, or other photonic components described below) and may include electrical routing (e.g., conductive features 113, see FIGS. 6G-6H) or other electrical components. The electrical routing provides electrical connection between components of the photonic system 103 (e.g., sites 10, dies 212/214/etc., or the interconnect substrate 30, etc.), and may transmit electrical signals or electrical power between components. The optical network 40 allows sites 10 to communicate using optical signals. For example, the EIC 214 may be electrically connected to a photodetector 154 formed in the routing structure 120 that detects optical signals in the optical network 40. The EIC 214 may also be electrically connected to a modulator 156 within the routing structure 120 that generates optical signals by modulating light within the optical network 40. The optical network 40 may include waveguides formed from silicon (silicon waveguides 50) and waveguides formed from silicon nitride (nitride waveguides 60). The optical network 40 may include one or more edge couplers 90 that couple optical signals between the optical network 40 and an optical fiber 140. In this manner, the optical network 40 may communicate with external components through one or more optical fibers 140.

Turning to FIGS. 6A through 14D, intermediate steps in the formation of an IPS 20 are shown, in accordance with some embodiments. The process shown in FIGS. 6A through 14D may be used to form a photonics structure such as those shown in FIGS. 1A-1C through 5, though other processes may be used in other embodiments. FIGS. 6A-6H show cross-sectional views of forming a silicon waveguide 50 of an IPS 20, in accordance with some embodiments. The formation of the features shown in FIGS. 6A-6H may be part of a Back End of Line (BEOL) process, in some embodiments. FIGS. 7A through 10D show plan views or cross-sectional views of intermediate steps in the formation of a nitride waveguide 60 and a mode converter 80, in accordance with some embodiments. The process shown in FIGS. 7A through 10D may be performed subsequent to the process shown in FIGS. 6A-6H as part of the formation of a photonics system. FIGS. 11A through 14D show plan views or cross-sectional views of intermediate steps in the formation of a nitride waveguide 60 and an edge coupler 90, in accordance with some embodiments. The process shown in FIGS. 11A through 14D may be performed subsequent to the process shown in FIGS. 6A-6H as part of the formation of a photonics system. In some embodiments, the process shown in FIGS. 7A through 10D and the process shown in FIGS. 11A through 14D may be performed at the same time.

Figure 6A:
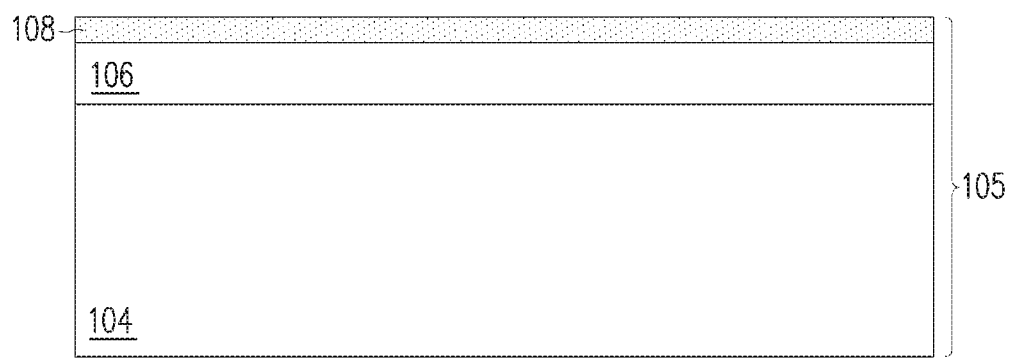

FIGS. 6A-6H show a process for forming a silicon waveguide 50 in an IPS 20, in accordance with some embodiments. Turning first to FIG. 6A, an oxide layer 106 is formed over a substrate 104, and a silicon layer 108 is formed over the oxide layer 106. The substrate 104 may be a material such as a glass, ceramic, dielectric, or a semiconductor substrate. For example, the substrate 104 may include a bulk semiconductor or the like, which may be doped (e.g., with a p-type or an n-type dopant) or undoped. In some embodiments, the substrate 104 is a wafer, such as a silicon wafer or other type of semiconductor wafer. Other substrate materials, such as a multi-layered or gradient substrate may also be used. In some embodiments, the material of the substrate 104 may include silicon, germanium, a compound semiconductor including silicon carbide, gallium arsenic, gallium phosphide, indium phosphide, indium arsenide, and/or indium antimonide, an alloy semiconductor including SiGe, GaAsP, AlInAs, AlGaAs, GaInAs, GaInP, and/or GaInAsP, the like, or combinations thereof. The oxide layer 106 may be, for example, a silicon oxide or the like. In some embodiments, the oxide layer 106 may have a thickness between about 0.5 μm and about 4 μm. The silicon layer 108 may comprise doped silicon or undoped silicon, and may have a thickness between about 0.1 μm and about 1.5 μm. In some embodiments, the substrate 104, oxide layer 106, and silicon layer 108 may be formed as a buried oxide ("BOX") substrate, shown in FIG. 6A as BOX substrate 105.

Figure 6B:
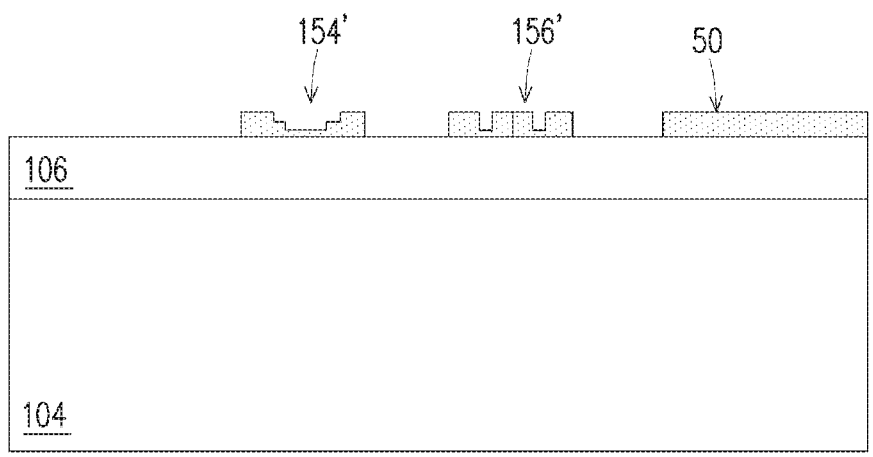

In FIG. 6B, the silicon layer 108 is patterned to form silicon regions for the silicon waveguide 50 and other photonic components. For example, as shown in FIG. 6B, patterned region 154' of the silicon layer 108 may be used to form a photodetector 154, and patterned region 156' of the silicon layer 108 may be used to form a modulator 156. The silicon layer 108 may be patterned using photolithography and etching techniques. For example, a hardmask layer (e.g., a nitride layer or other dielectric material, not shown in FIG. 6B) may be formed over the silicon layer 108 and patterned. The pattern of the hardmask layer may then be transferred to the silicon layer 108 using one or more etching techniques, such as dry etching and/or wet etching techniques. In some embodiments, more than one photolithography and etching sequence may be used in order to pattern the silicon layer 108 into patterned regions 154' or 156'. For illustrative purposes, the photonic components (e.g., 154, 156, etc.) and the silicon waveguide 50 are shown as disconnected, but the photonic components and/or the silicon waveguide 50 may be connected or arranged as required for a particular design, such as that illustrated in FIGS. 3A-3C.

Figure 6C:
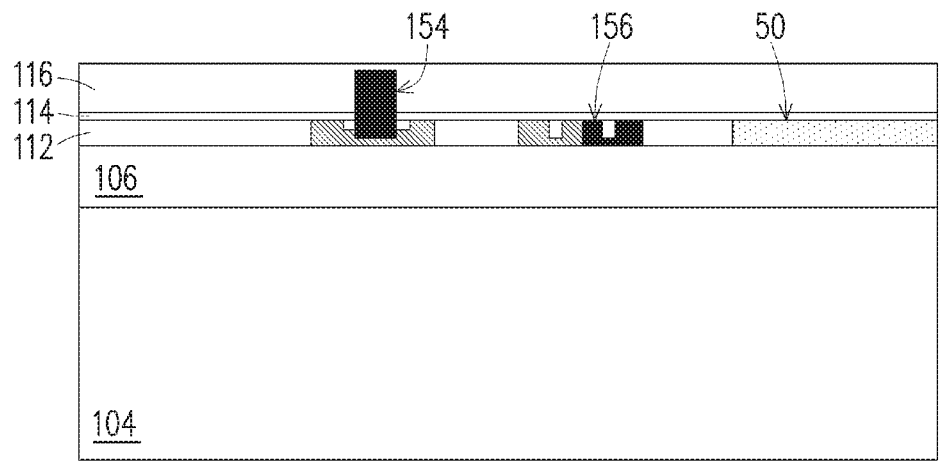

In FIG. 6C, an oxide layer 112 is formed over the oxide layer 106 and patterned silicon layer 108. The oxide layer 112 may be formed by a high density plasma chemical vapor deposition (HDP-CVD), a flowable CVD (FCVD) (e.g., a CVD-based material deposition in a remote plasma system and post curing to make it convert to another material, such as an oxide), the like, or a combination thereof. Other insulation materials formed by any acceptable process may be used. In some embodiments, a planarization process (e.g., a chemical-mechanical polishing process) is performed such that the oxide layer 112 and the patterned portions of the silicon layer 108 are coplanar. Thus, the oxide layer 112 may have about the same thickness as the silicon waveguide 50, which may be between about 100 nm and about 600 nm, such as about 2200 Å. After planarizing the oxide layer 112, an implantation process may be performed to introduce dopants within the silicon regions 154' and 156', as part of the formation of the photodetector 154 and modulator 156. The silicon regions 154' or 156' may be doped with p-type dopants, n-type dopants, or a combination.

Still referring to FIG. 6C, an optional etch stop layer (ESL) 114 may be formed over the silicon regions 154' and 156' and over the silicon waveguide 50, in some embodiments. The ESL 114 may be a material such as silicon carbide (SiC), silicon carbonitride (SiCN), silicon oxycarbonitride (SiOCN), or the like, and may have a thickness between about 500 Å and about 2500 Å, such as about 1800 Å. The ESL 114 may be formed by chemical CVD, plasma-enhanced CVD (PECVD), atomic layer deposition (ALD), the like, or a combination thereof. In some embodiments, a photodetector 154 may be formed from the silicon region 154' by patterning an opening in the oxide layer 112 and through the ESL 114 to expose the silicon region 154'. A semiconductor material (not individually labelled) may then be epitaxially grown on the silicon region 154' exposed by the opening. The semiconductor material may be, for example, germanium (Ge), which may be doped or un-doped. After forming the semiconductor material, a dielectric layer 116 may be formed over the ESL 114 and the semiconductor material. The dielectric layer 116 may be an oxide, a nitride, the like, or a combination thereof, and may be formed by a process such as CVD, PVD, or the like. In some embodiments, the dielectric layer 116 is an oxide similar to oxide layer 112. Other dielectric materials formed by any acceptable process may be used. The dielectric layer 116 may be formed having a thickness between about 500 Å and about 5000 Å.

Figure 6D:
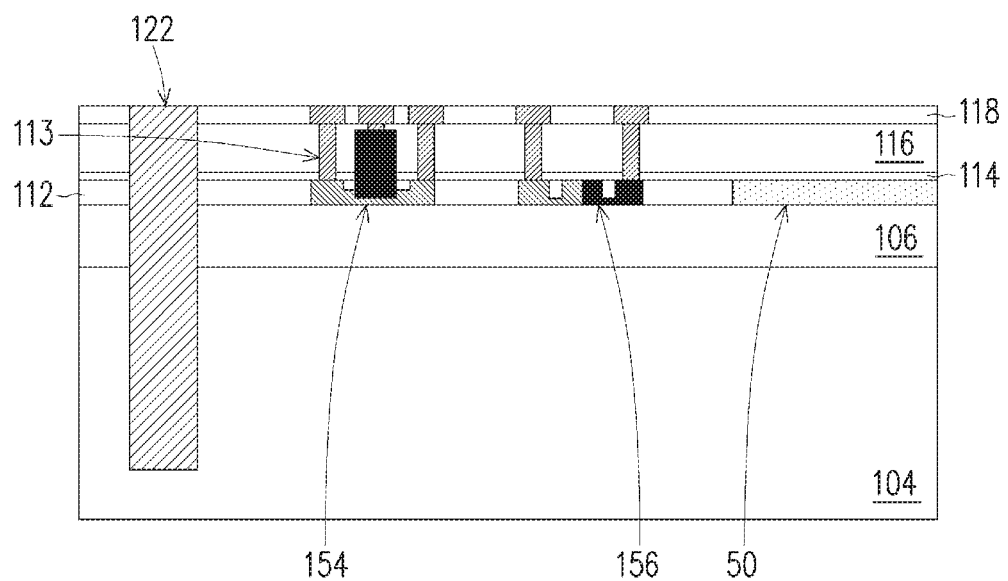

Turning to FIG. 6D, vias 122 and conductive features 113 are formed, in accordance with some embodiments. The vias 122 may be, for example, through substrate vias (TSVs) or the like. The conductive features 113 may include contacts, vias, metallization layers, electrical routing lines, the like, or a combination. For example, the conductive features 113 shown in FIG. 6D may include contacts to the photodetector 154 or modulator 156. In some embodiments, a dielectric layer 118 is formed over the dielectric layer 116 prior to formation of vias 122 or conductive features 113. The dielectric layer 118 may be a material similar to dielectric layer 116, and may be formed using similar techniques. After formation, the dielectric layer 118 may be planarized using, e.g., a CMP process.

In some embodiments, openings for the vias 122 are formed through oxide layers 106 and 112 and dielectric layers 116 and 118 partially into the substrate 104, using acceptable photolithography and etching techniques. A conductive material may then be formed in the openings, forming vias 122. A liner (not shown), such as a diffusion barrier layer, an adhesion layer, or the like, may be formed in the openings from a material such as TaN, Ta, TiN, Ti, CoW, or the like, and may be formed in the openings by a deposition process such as ALD or the like. In some embodiments, a seed layer (not shown), which may include copper or a copper alloy, may be deposited in the openings. The conductive material of the vias 122 may be formed in the openings using, for example, ECP, electro-less plating, or the like. The conductive material may be a metallic material including a metal or a metal alloy such as copper, silver, gold, tungsten, cobalt, aluminum, the like, or alloys thereof. A planarization process, such as a CMP process, may be performed to remove excess conductive material along the top surface of the oxide layer 118, such that top surfaces of the vias 122 and oxide layer 118 are level. In some embodiments, the backside of the substrate 104 may be thinned to expose the vias 122 for forming electrical connections to the vias 122.

Still referring to FIG. 6D, the conductive features 113 may be formed by a damascene process, e.g., dual damascene, single damascene, or the like. For example, in some embodiments, openings for the conductive features 113 are first formed in the oxide layers 118 and 116, using acceptable photolithography and etching techniques. A conductive material may then be formed in the openings, forming the conductive features 113. The conductive material of the conductive features 113 may be formed of a metal or a metal alloy including aluminum, copper, tungsten, or the like. The conductive features 113 may be formed using other techniques or materials in other embodiments.

Turning to FIG. 6E-F, additional dielectric layers and conductive features 113 are formed over the dielectric layer 118, forming a routing region 121. FIG. 6F shows a cross-sectional view along cross-section F-F' indicated in FIG. 6E. The routing region 121 includes dielectric layers, conductive features 113, photonic components, silicon waveguides 50, and other features present in the final routing structure 120 (see FIG. 2 or 5). For clarity, the additional dielectric layers are not individually labeled, and more or fewer dielectric layers than shown may be present in the routing region 121. The additional dielectric layers may be materials similar to dielectric layers 114 or 116 or oxide layers 106 or 112, and may be formed using similar techniques. The additional conductive features 113 may include vias or metal lines, and may be formed in a manner similar to the conductive features 113 of FIG. 6D. In some embodiments, one or more conductive pads 115 may be formed on conductive features 113. Conductive connectors 220 (see FIGS. 2 and 5) are subsequently formed on the conductive pads 115. The conductive pads 115 may be a conductive material including aluminum, copper, tungsten, or the like. In some embodiments, a passivation layer 117 is then formed over the routing region 121. The passivation layer 117 may be a material such as SiN or the like, and may have a thickness between about 1 μm and about 3 μm. The passivation layer 117 may be formed using acceptable deposition techniques, such as those described previously.

Turning to FIGS. 6G-6H, the routing region 121 is recessed over regions of the silicon waveguide 50, forming recessed region 121'. The routing region 121 may be recessed using acceptable photolithography and etching techniques. The etching techniques may include a dry etching process and/or a wet etching process, and the recessing may include multiple etching steps. In some embodiments, the routing region 121 is recessed using an etching process such that a portion of the ESL 114 remains, the remaining portion indicated in FIGS. 6G-6H as ESL 114'. In some embodiments, the remaining portion of the ESL 114' has a thickness between about 100 Å and about 500 Å, such as about 400 Å. In some embodiments, the remaining portion of the ESL 114' has a thickness less than about 100 Å, such as less than about 50 Å. In some embodiments, the routing region 121 is recessed using an etching process that completely removes the ESL 114 and exposes the silicon waveguides 50. The recessed regions 121' may correspond to regions of the IPS 20 in which silicon waveguides 60 and/or cladding 70 is formed (see FIG. 3A). The remaining portions of the routing regions 121 that are not recessed may correspond to regions of the IPS 20 in which the cladding 70 is not formed, for example, regions over which dies may be placed.

Figure 7C:
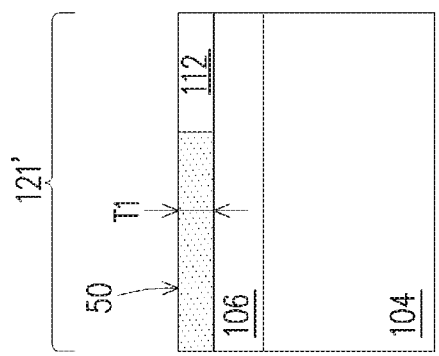
FIGS. 7A-7C through 10A-10D illustrate cross-sectional views and plan views of intermediate steps during a process for forming a hybrid optical network of an integrated photonic structure, in accordance with some embodiments.
Figure 7B:
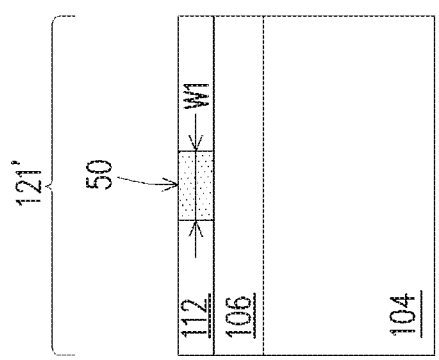

Turning to FIGS. 7A-7C through 10A-10D, intermediate stages in the formation of a nitride waveguide 60 (see, e.g., FIG. 10B-10C) and a mode converter 80 (see, e.g., FIG. 10A) are shown, in accordance with some embodiments. The process shown in FIGS. 7A through 10D may be performed on the structure shown in FIG. 6G-6H, in some embodiments. The mode converter 80 couples a silicon waveguide 50 and a nitride waveguide 60, allowing optical signals to be transmitted between the silicon waveguide 50 and the nitride waveguide 60. FIGS. 7A, 8A, 9A and 10A show a plan view, and FIGS. 7B-7C, 8B-8C, 9B-9C, and 10B-10D show cross-sectional views as indicated on each plan view. For example, FIG. 7B shows the cross-sectional view through cross-section B-B' shown in FIG. 7A.

Figure 7A:
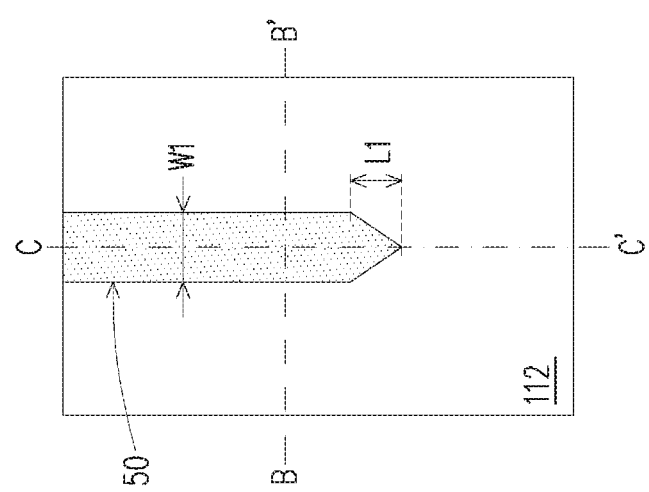

In FIGS. 7A-7C, a recessed region 121' of the routing region 121 is shown, similar to the recessed region 121' shown in FIGS. 6G-6H. In the recessed region 121' shown in FIG. 7A, the silicon layer 108 (see FIGS. 6A-6B) has been patterned to form a silicon waveguide 50 having a tapered end. In some embodiments, the silicon waveguide 50 has a width W1 that is between about 250 nm and about 1000 nm or a thickness T1 that is between about 100 nm and about 600 nm. The tapered end of the silicon waveguide 50 has a length L1 between about 10 μm and about 500 μm, in some embodiments. In some embodiments, the tapered end of the silicon waveguide 50 may have a tapering angle that is between about 0.7 degrees and about 1.4 degrees with respect to the longitudinal direction of the silicon waveguide 50. In other embodiments, the end of the silicon waveguide 50 may have a shape that is different than a tapered shape, such as a rounded shape or a flat shape.

Figure 8C:
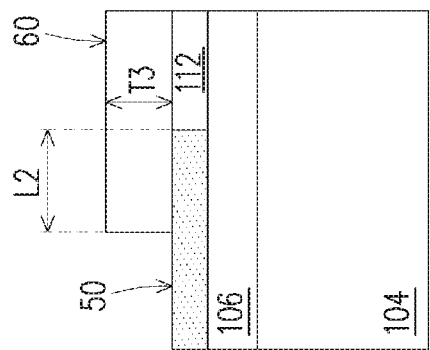
Figure 8B:
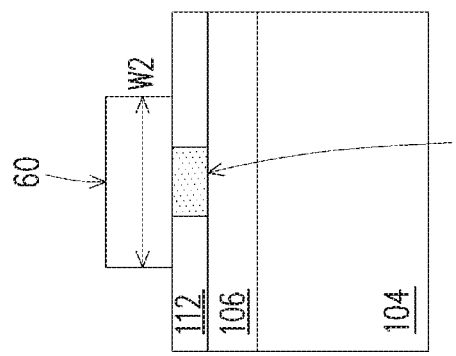
Figure 8A:
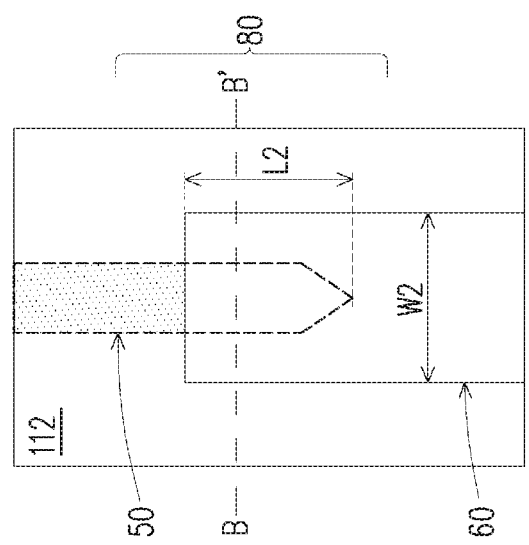

Turning to FIGS. 8A-8C, a nitride waveguide 60 is formed over the silicon waveguide 50 shown in the structure of FIG. 7A-7C. The nitride waveguide 60 may be formed by, for example, depositing a layer of silicon nitride (not shown) over the oxide layer 112 and silicon waveguide 50, and then patterning the silicon nitride layer using acceptable photolithography and etching techniques. The silicon nitride layer may also be formed over the entire structure, such as over the routing region 121 and over the recessed region 121'. In some embodiments, a photoresist structure may be formed over the silicon nitride layer and patterned, and then the pattern transferred to the silicon nitride layer using an etching process to form nitride waveguides 60. The etching process may include a dry etching process and/or a wet etching process, and the etching process may be selective to silicon nitride over silicon oxide or other materials (e.g., the material of the passivation layer 117), in some embodiments. The etching process may remove silicon nitride from over the routing region 121 or from over portions of the recessed region 121', for example. The silicon nitride may be formed using a suitable deposition technique, such as CVD, LPCVD, PVD, or the like. In some embodiments, the nitride waveguides 60 may have a width W2 that is between about 200 nm and about 1000 nm, and a thickness T3 that is between about 200 nm and about 500 nm. The end of the nitride waveguide 60 is shown as flat, but the end of the nitride waveguide 60 may have another shape (e.g., a tapered shape, rounded shape, etc.) in other embodiments.

As shown in FIGS. 8A-8C, the nitride waveguide 60 is formed over the silicon waveguide 50 and the oxide layer 112, and the nitride waveguide 60 extends over the tapered end of the silicon waveguide 50. In some embodiments, the nitride waveguide 60 extends over the silicon waveguide 50 by a length L2 from the end of the silicon waveguide 50 that is between about 20 μm and about 500 μm. The tapered shape of the end of the silicon waveguide 60 causes optical signals within the silicon waveguide 50 to be extinguished and a portion of the energy of the optical signal to be coupled into the nitride waveguide 60. Similarly, optical signals within the nitride waveguide can couple into the silicon waveguide 50. In this manner, a mode converter 80 is formed to couple optical modes of the silicon waveguide 50 and optical modes of the nitride waveguide 60.

FIGS. 9A-9C and 10A-10D illustrate the formation of a cladding 70 (see FIGS. 10A-10D) surrounding the silicon waveguides 50 and the nitride waveguides 60. In some embodiments, the cladding 70 is formed by patterning an oxide layer 124 (see FIGS. 9A-9C) formed over the silicon waveguides 50 and the nitride waveguides 60. The oxide layer 124 is patterned such that sidewall surfaces and/or the top surfaces of the cladding 70 are exposed to the air (e.g., the ambient atmosphere). The interface between the higher dielectric constant of the cladding 70 and the lower dielectric constant of the air may reduce leakage of light from within the cladding 70. By forming the cladding 70 such that regions of the silicon waveguides 50 and nitride waveguides 60 are covered by the cladding 70 and laterally isolated by air, the confinement of the optical signals within the silicon waveguides 50 and nitride waveguides 60 may be improved. In some cases, forming a cladding 70 surrounded by air as described can reduce the amount of optical signal loss due to optical coupling between the silicon waveguide 50 and the substrate 104. In this manner, the cladding 70 may be considered a second mode converter that operates with mode converter 80 to improve the coupling efficiency between silicon waveguides 50 and nitride waveguides 60.

Figure 9C:
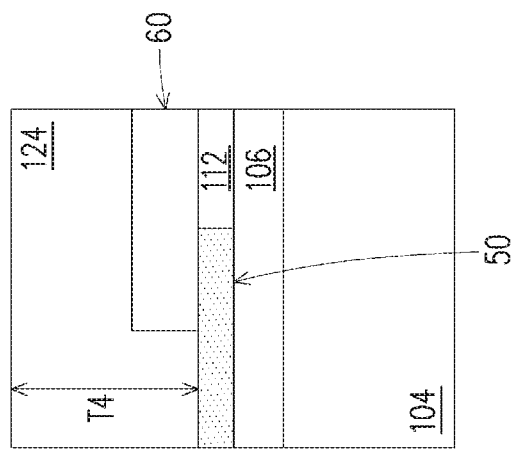
Figure 9B:
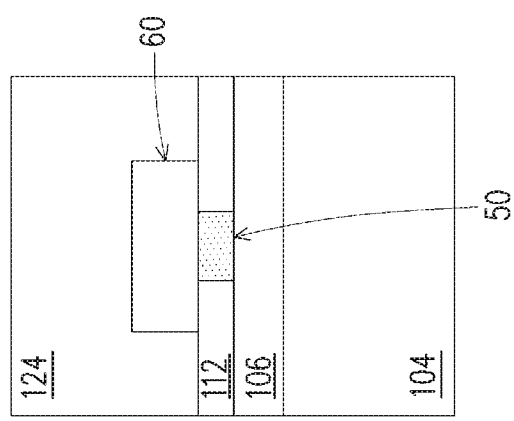
Figure 9A:
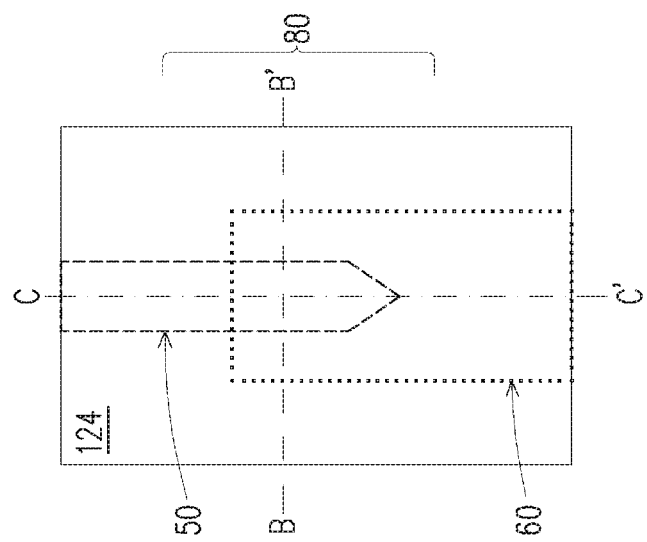
Figure 10B:
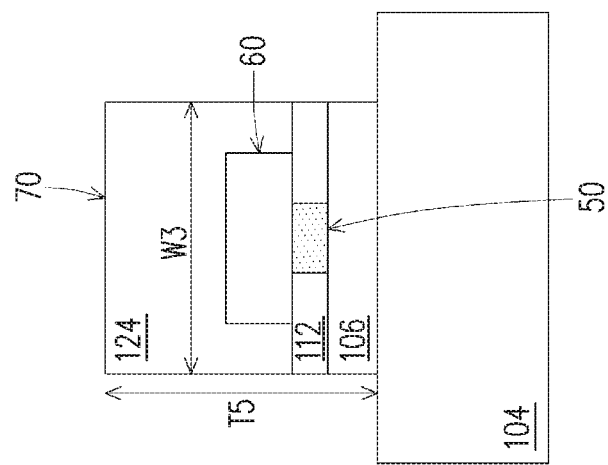
Figure 10A:
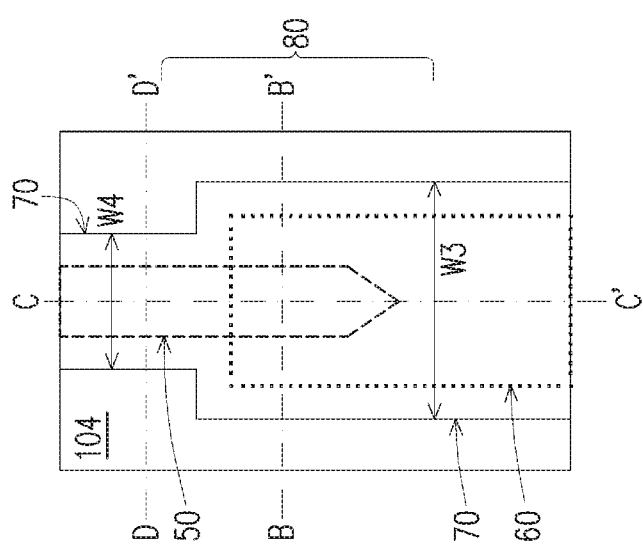
Figure 10D:
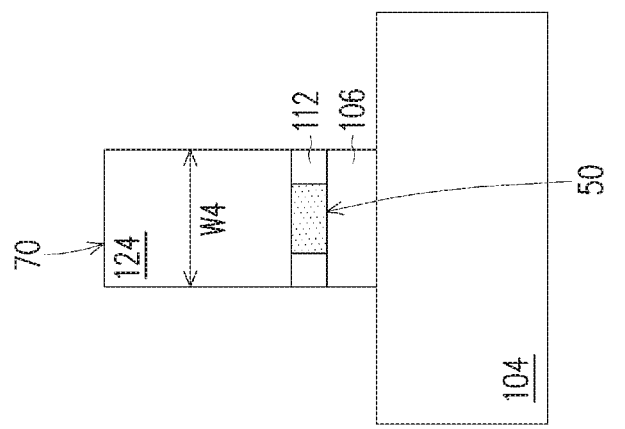
Figure 10C:
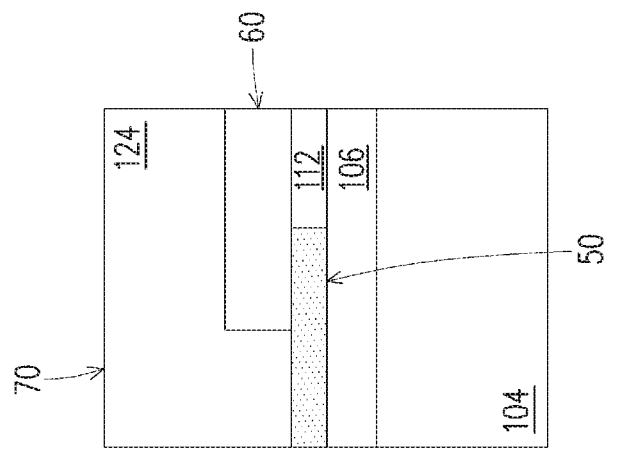

Turning to FIG. 9A-9C, an oxide layer 124 is formed over the oxide layer 112, the exposed silicon waveguides 50, and the nitride waveguides 60. The oxide layer 124 may be a material similar to the oxide layer 112 and may be formed using similar techniques. In some embodiments, the oxide layer 124 may be formed having a thickness T4 above the oxide 112 of between about 4 μm and about 8 μm. In FIGS. 10A-10D, the oxide layer 124 is patterned to form the cladding 70. The oxide layer 124 may be patterned using acceptable photolithography and etching techniques. For example, a photoresist structure may be formed over the oxide layer 124 and patterned, and then the pattern transferred to the oxide layer 124 using an etching process to form the cladding 70. The etching process may include a dry etching process and/or a wet etching process, and the etching process may be selective to silicon oxide over silicon, in some embodiments. In some embodiments, regions of the cladding 70 surrounding the nitride waveguides 60 may have a width W3 around that is between about 1.0 μm and about 2.5 μm, and regions of the cladding 70 surrounding the silicon waveguides 50 may have a width W4 around that is between about 6 µm and about 10 µm. In some embodiments, the cladding 70 may have a thickness T5 that is between about 8 µm and about 10 µm.

Figure 11B:
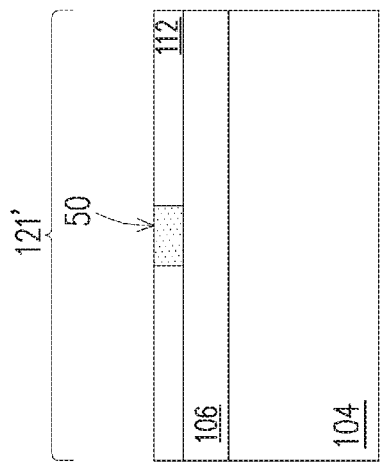
FIGS. 11A-11C through 14A-14D illustrate cross-sectional views of intermediate steps during a process for forming an edge coupler of an integrated photonic structure, in accordance with some embodiments.

Turning to FIGS. 11A-11C through 16A-16C, intermediate stages in the formation of an edge coupler 90 are shown, in accordance with some embodiments. The process shown in FIGS. 11A through 16C may be performed on the structure shown in FIGS. 6G-6H, in some embodiments. The process shown in FIGS. 11A through 16C may be performed simultaneously with the process shown in FIGS. 7A through 10D. The edge coupler 90 couples a silicon waveguide 50 to an optical fiber 140 (see, for example, FIGS. 2, 3A, or 5), allowing optical signals to be transmitted between the silicon waveguide 50 and external components (not shown). FIGS. 11A, 12A, 13A, 14A, 15A, and 16A show a plan view, and FIGS. 11B-11C, 12B-12C, 13B-13C, 14B-14D, 15B-15C, and 16B-16C show cross-sectional views as indicated on each plan view. For example, FIG. 11B shows the cross-sectional view through cross-section B-B' shown in FIG. 11A.

Figure 11C:
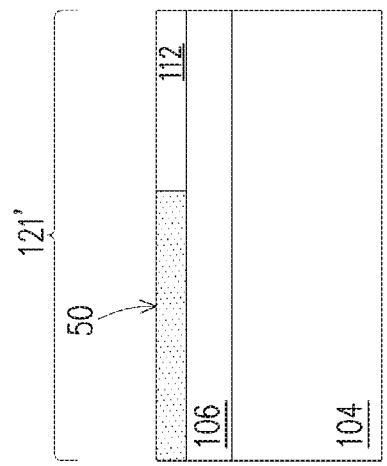
Figure 11A:
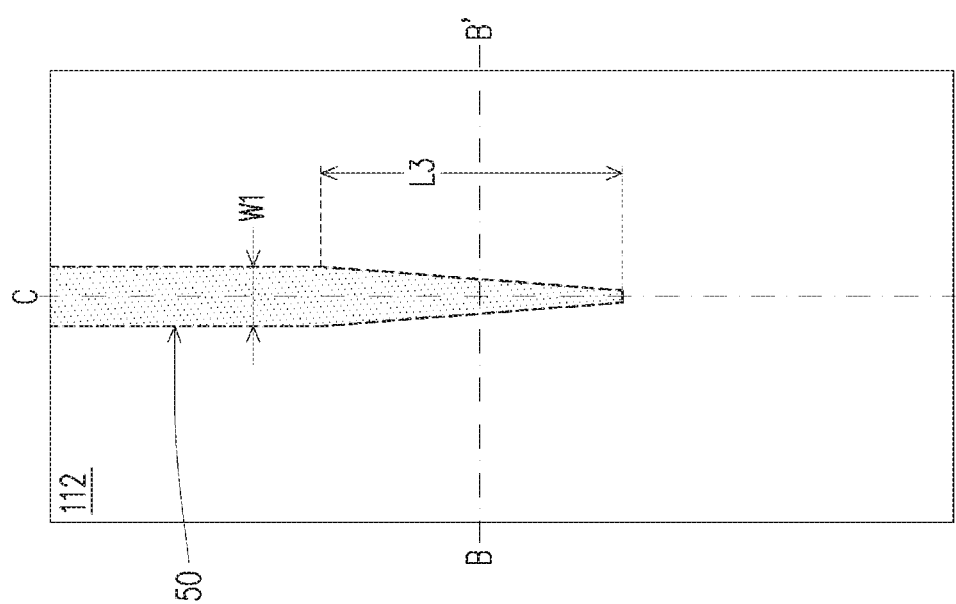

In FIGS. 11A-11C, a recessed region 121' of the routing region 121 is shown, similar to the recessed region 121' shown in FIGS. 6G-6H. The recessed region 121' shown in FIGS. 11A-11C and the recessed region 121' shown in FIGS. 7A-7C may be, for example, different recessed regions 121' of the same structure shown in FIGS. 6G-6H. In the recessed region 121' shown in FIG. 11A, the silicon layer 108 (see FIGS. 6A-6B) has been patterned to form a silicon waveguide 50 having a tapered end. The patterned silicon waveguide 50 shown in FIGS. 11A-11C may have the same shape or a different shape than the patterned silicon waveguide 50 shown in FIGS. 7A-7C. In some embodiments, the tapered end of the silicon waveguide 50 has a length L3 between about 50 µm and about 500 µm. The end of the silicon waveguide 50 may taper to a point or may taper to a blunt end, as shown in FIG. 11A. In some embodiments, the tapered end of the silicon waveguide 50 may have a tapering angle that is between about 0.1 degrees and about 0.6 degrees with respect to the longitudinal direction of the silicon waveguide 50. In other embodiments, the end of the silicon waveguide 50 may have a shape that is different than a tapered shape, such as a rounded shape, a flat shape, or another shape.

Figure 12B:
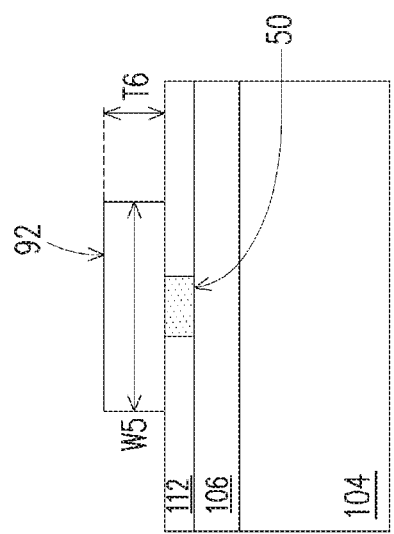
Figure 12C:
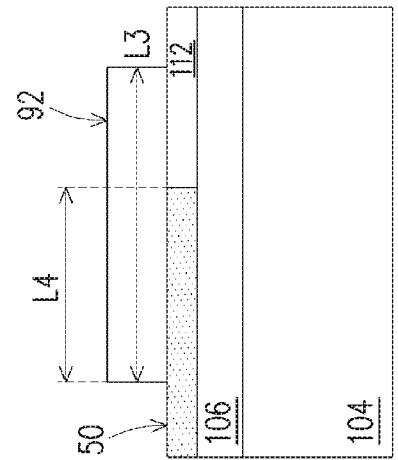
Figure 12A:
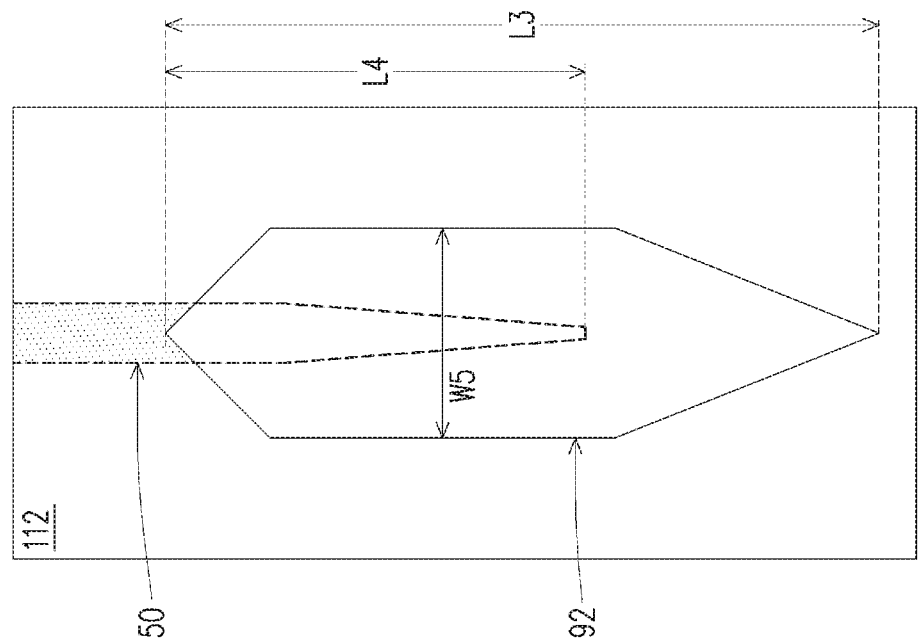

Turning to FIGS. 12A-12C, a nitride coupler 92 is formed over the end of the silicon waveguide 50 shown in the structure of FIG. 11A-11C. Optical signals are coupled from the tapered end of the silicon waveguide 50 into the nitride coupler 92. The nitride coupler 92 then couples the optical signals into the optical fiber 140. The use of a nitride coupler 92 in an edge coupler 90 to couple optical signals from a silicon waveguide 50 to an optical fiber 140 as described may increase the optical confinement of the coupled optical signals and thus reduce loss and improve the coupling efficiency. The nitride coupler 92 may be formed from silicon nitride in a similar manner as the nitride waveguides 60 described previously, and may be formed simultaneously with the nitride waveguides 60. The nitride coupler 92 may be formed by, for example, depositing a layer of silicon nitride (not shown) and then patterning the silicon nitride layer using acceptable photolithography and etching techniques. The nitride coupler 92 shown in FIG. 12A is an illustrative example, and the nitride coupler 92 may have different dimensions or a different shape than shown in FIG. 12A. For example, in other embodiments the nitride coupler 92 may have a tapered shape, a polygonal shape, a rectangular shape, a round shape, an irregular shape, or another shape. In some embodiments, the nitride coupler 92 may have a width W5 that is between about 0.5 µm and about 5 µm, and a thickness T6 that is between about 100 nm and about 500 nm. In some embodiments, the nitride coupler 92 may have about the same thickness as the nitride waveguides 60. The nitride coupler 92 may have a length L3 that is between about 400 µm and about 1600 µm. The nitride coupler 92 may extend over the silicon waveguide a length L4 from the end of the silicon waveguide 50 that is between about 100 µm and about 500 µm.

Figure 13B:
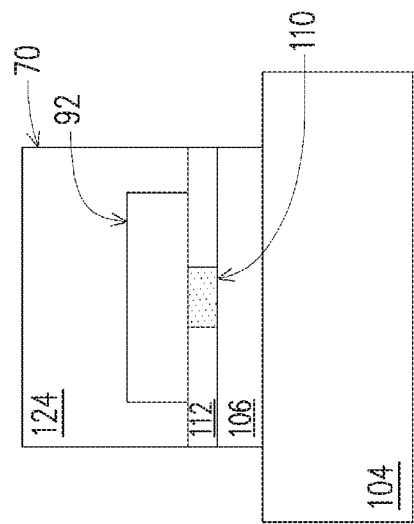
Figure 13C:
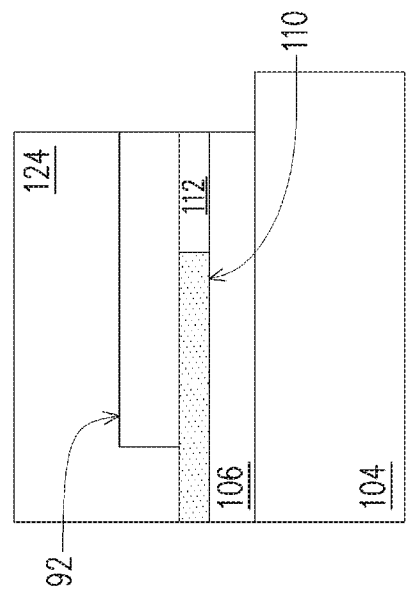
Figure 13A:
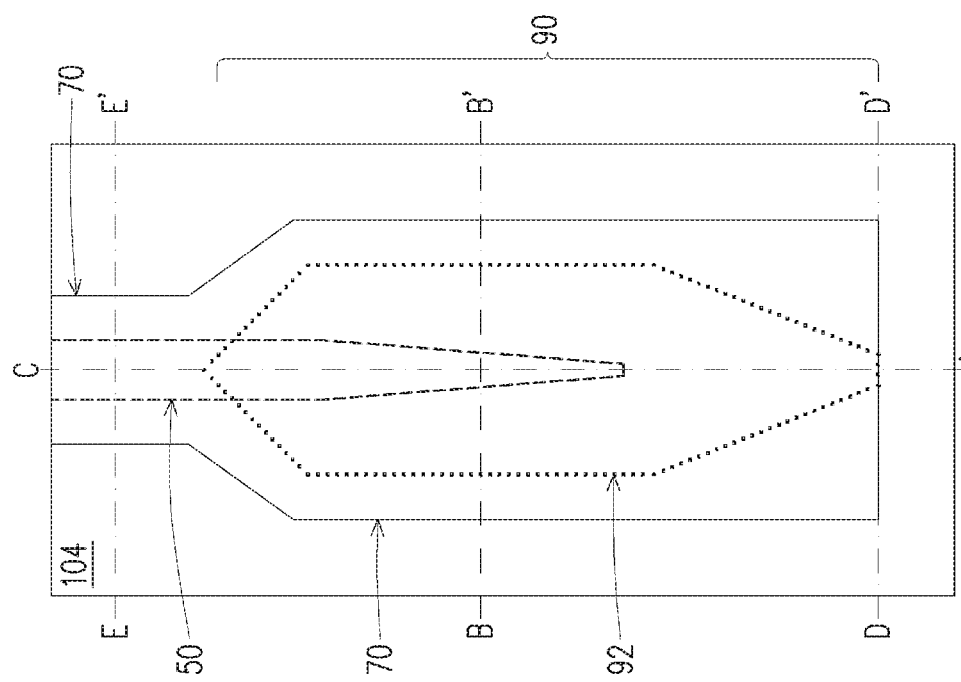
Figure 13E:
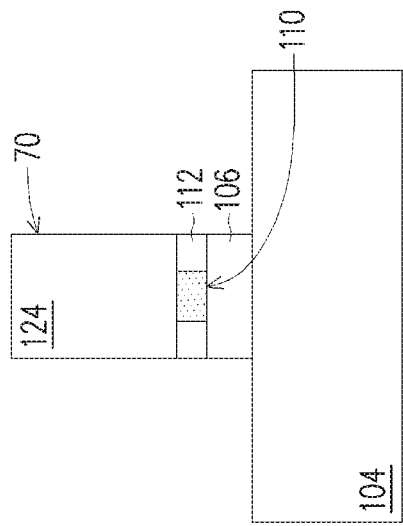
Figure 13D:
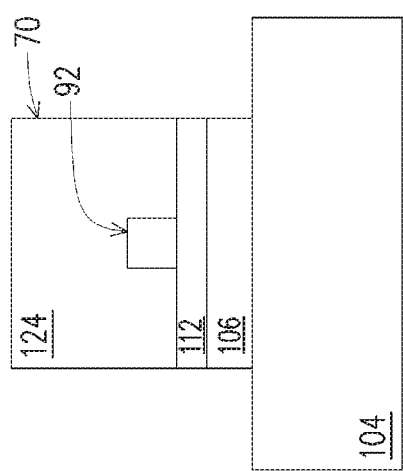
Figure 14B:
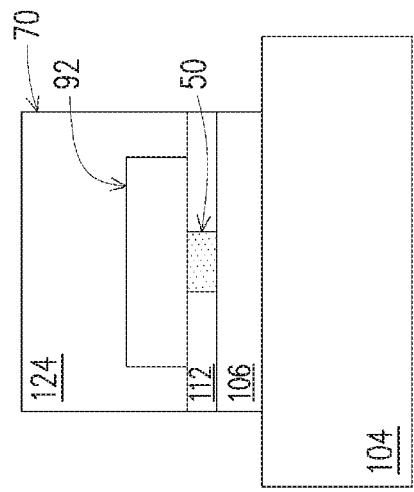
Figure 14C:
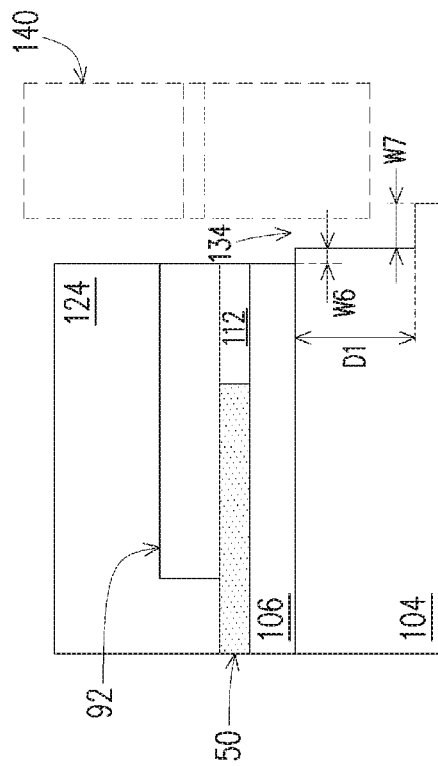
Figure 14A:
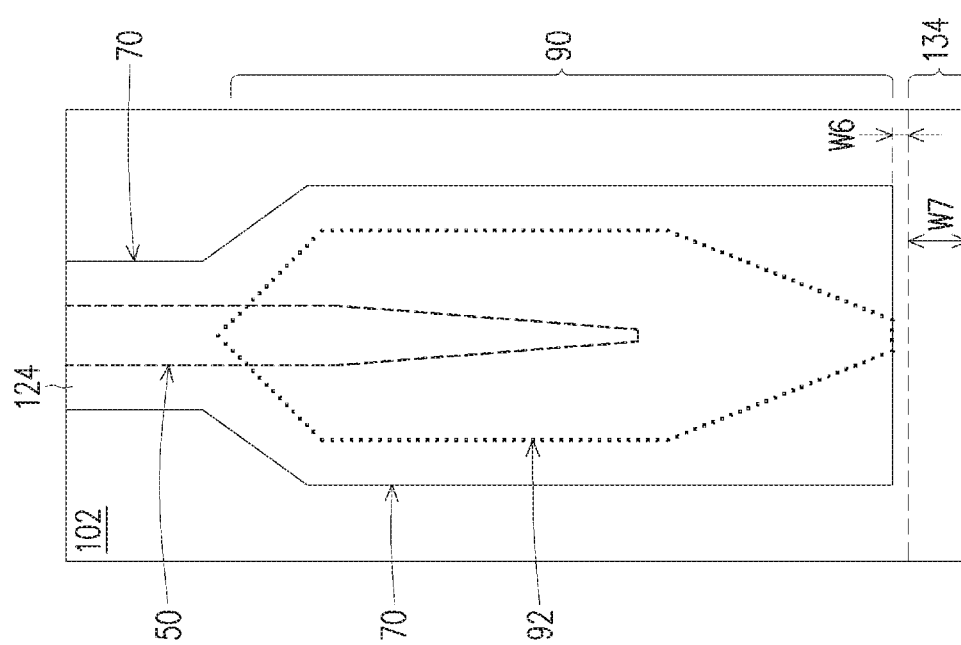
Figure 14D:
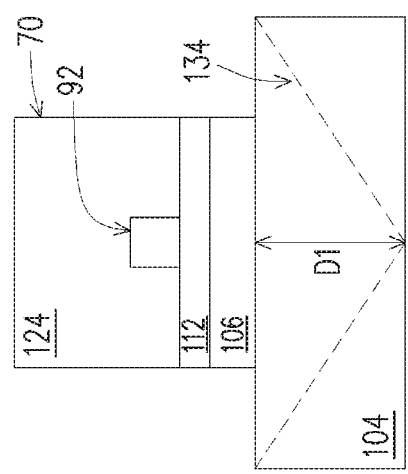

FIGS. 13A-13E illustrate the formation of a cladding 70 surrounding the nitride coupler 92 and silicon waveguide 50, forming edge coupler 90. The cladding 70 surrounding the edge coupler 90 may be formed with the cladding 70 described previously (see FIGS. 10A-10D). By forming the cladding 70 such that the edge coupler 90 is covered by the cladding 70 and laterally isolated by air, the loss of optical signal may be reduced. The cladding 70 may be formed by forming the oxide layer 124 over the nitride coupler 92 and then performing an etching process using a patterned mask, as described previously. In some embodiments, the etching process also etches a portion of the nitride coupler 92 such that a sidewall of the nitride coupler 92 is exposed after the etching process, as shown in FIGS. 13A, 13C, and 13D. In some embodiments, the width of the exposed sidewall of the nitride coupler 92 may be between about 100 nm and about 500 nm.

Turning to FIGS. 14A-14D, a fiber trench 134 is etched in the substrate 104. The fiber trench 134 is used to support an optical fiber 140 (shown illustratively in FIG. 14C) and facilitate alignment of the optical fiber 140 with the edge coupler 90. The fiber trench 134 may be formed by suitable photolithography and etching techniques. For example, a photoresist structure may be formed over the substrate 104 and patterned, and then the pattern transferred to the substrate 104 using an etching process to form the fiber trench 134. The etching process may include a dry etching process and/or a wet etching process, and the etching process may be selective to silicon over silicon oxide or silicon nitride, in some embodiments. The fiber trench 134 may have vertical or angled sidewalls, a flat bottom surface or a v-shaped bottom surface, or may have a different shape than these examples. In some cases, the shape and size of the fiber trench 134 may be controlled by controlling the characteristics of the etching process (e.g., etch time, choice of etchant, etc.). In some embodiments, an edge of the fiber trench 134 may be separated from the edge coupler 90 by a distance W6 that is between about 5 µm and about 50 µm. The fiber trench 134 may extend a distance W6 from an edge of the substrate 104 that is between about 0 µm and about 50 µm. The fiber trench 134 may have a depth D1 into the substrate 104 that is between about 50 µm and about 150 µm. In some embodiments, the optical fiber 140 may be secured within the fiber trench 134 by an optical glue (not shown). In some embodiments, more than one fiber trench 134 may be formed in the substrate 104. In this manner, FIGS. 6A-6C through 14A-14D describe embodiments of a photonic system including an optical network 40 that has both silicon waveguides 50 and nitride waveguides 60. In these embodiments, the nitride waveguide 60 is formed over the silicon waveguide 50, and an air-isolated cladding 70 is formed over the silicon waveguides 50 and nitride waveguides 60 in order to reduce optical leakage from the silicon waveguides 50 into the substrate 104.

Figure 15A:
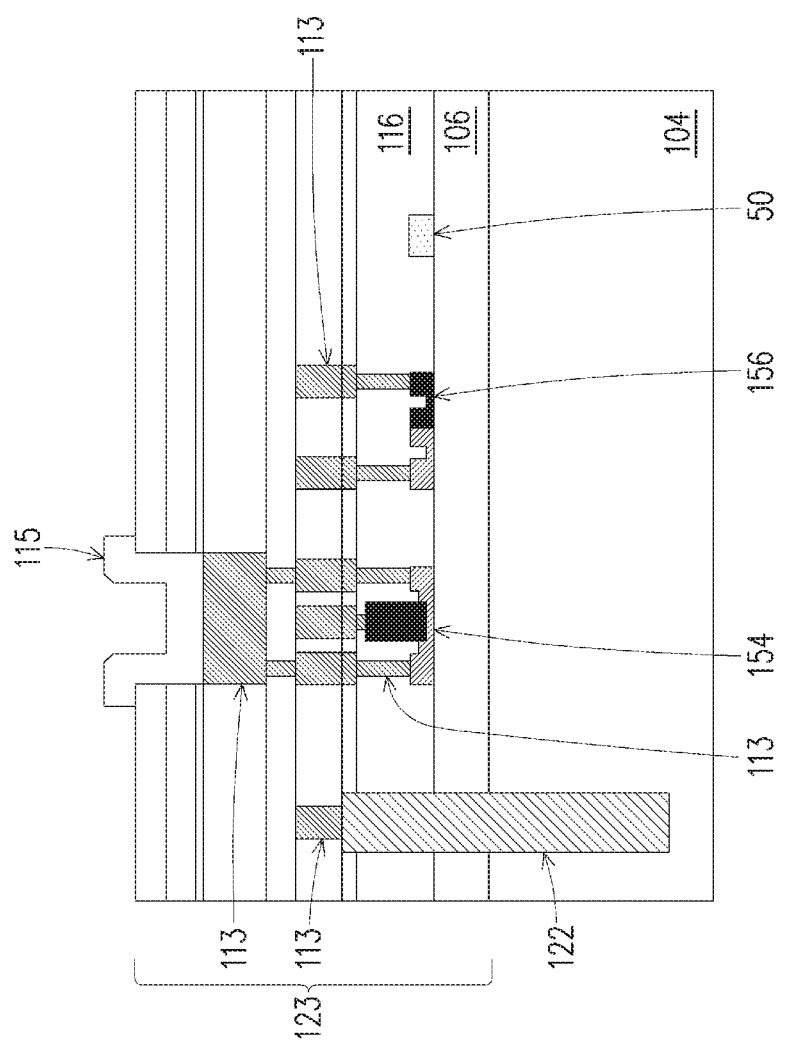
FIGS. 15A-15C illustrate cross-sectional views of intermediate steps during a process for forming a first integrated photonic structure, in accordance with some embodiments.
Figure 15B:
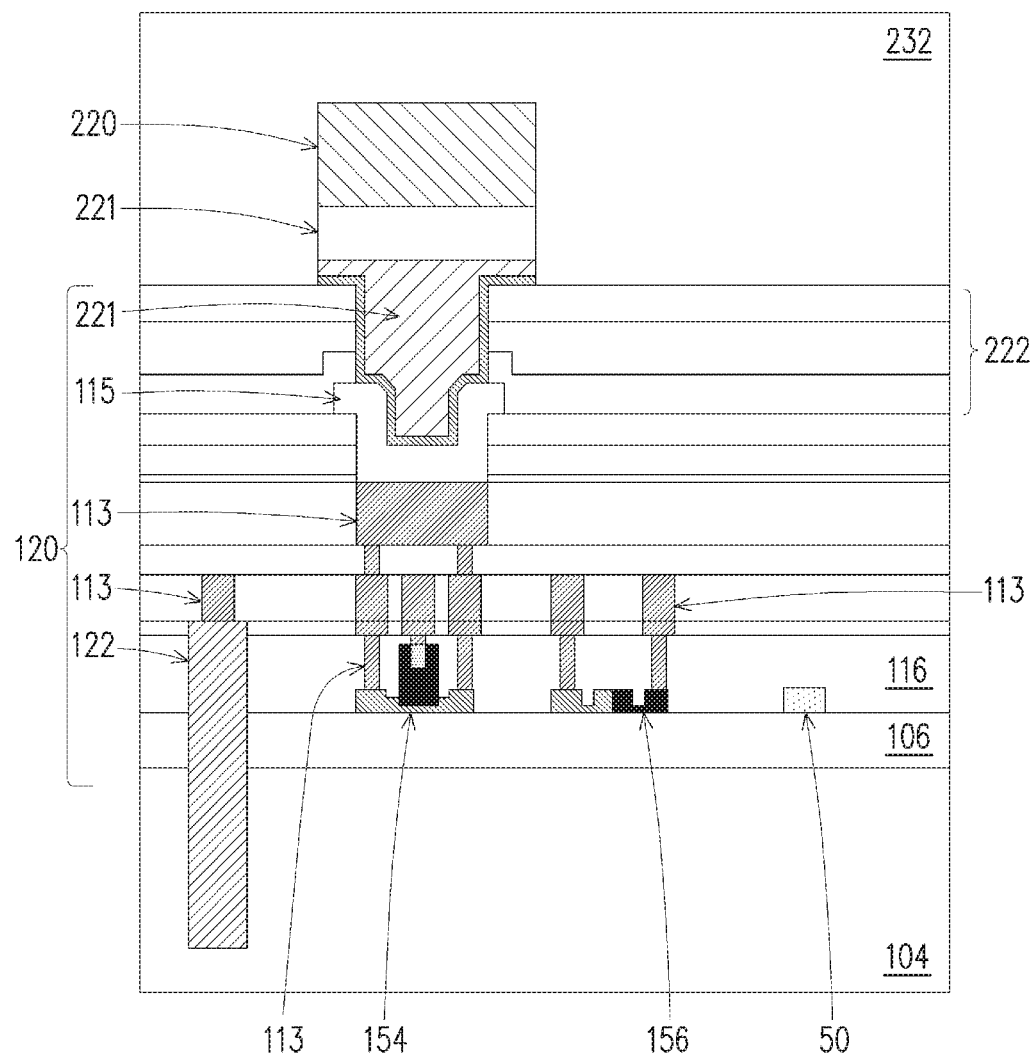
Figure 15C:
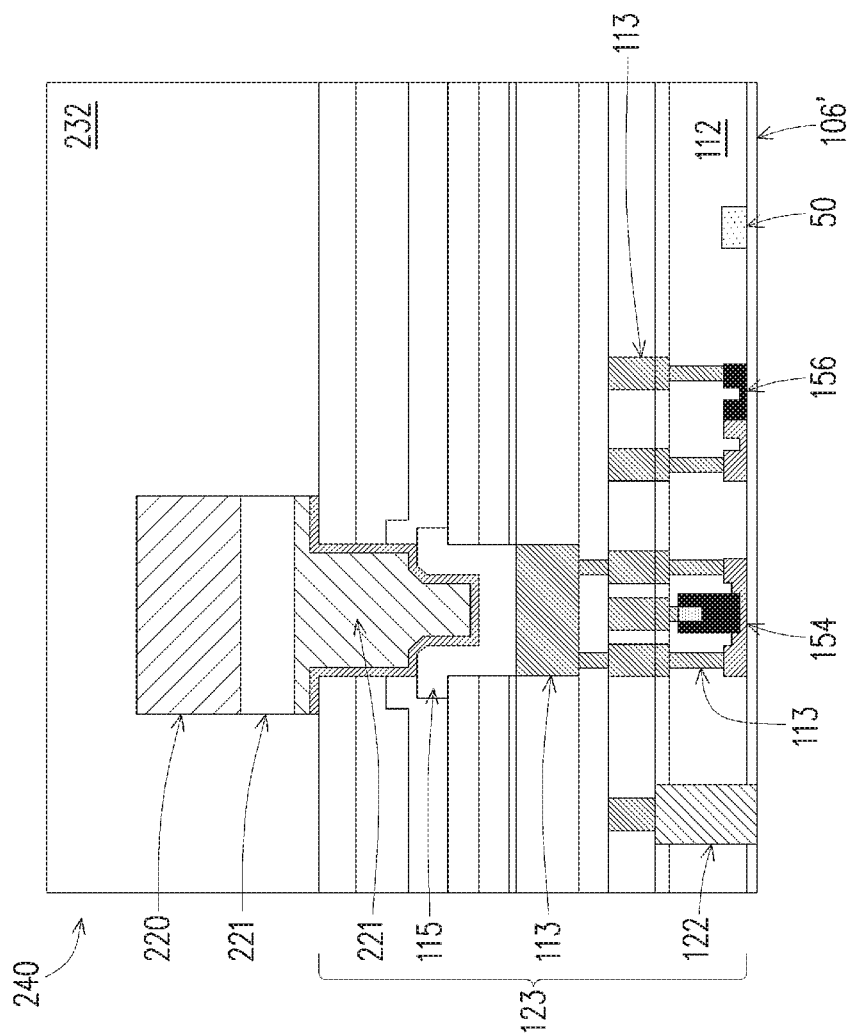
Figure 16B:
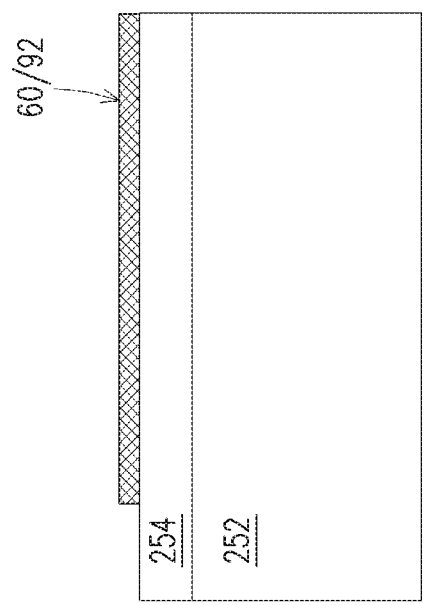
FIGS. 16A-16G illustrate cross-sectional views of intermediate steps during a process for forming a second integrated photonic structure, in accordance with some embodiments.
Figure 16A:
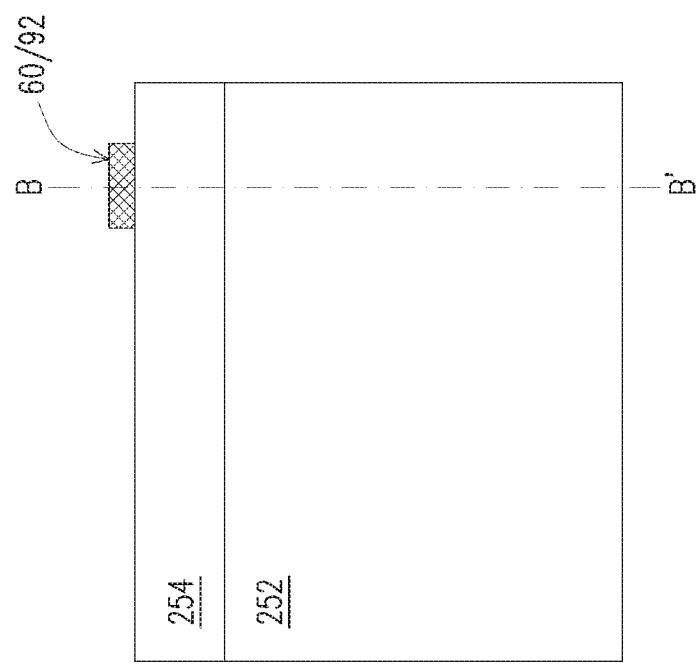
Figure 16D:
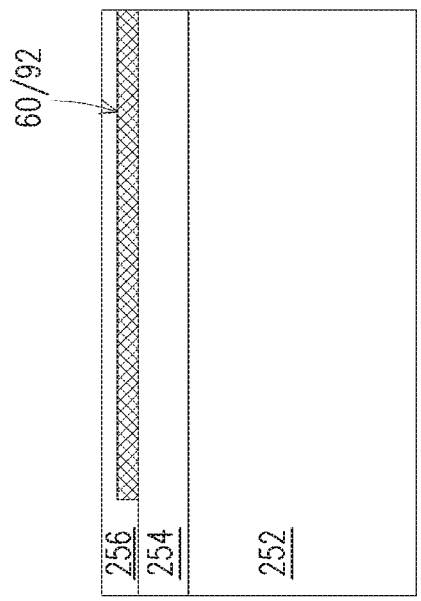
Figure 16C:
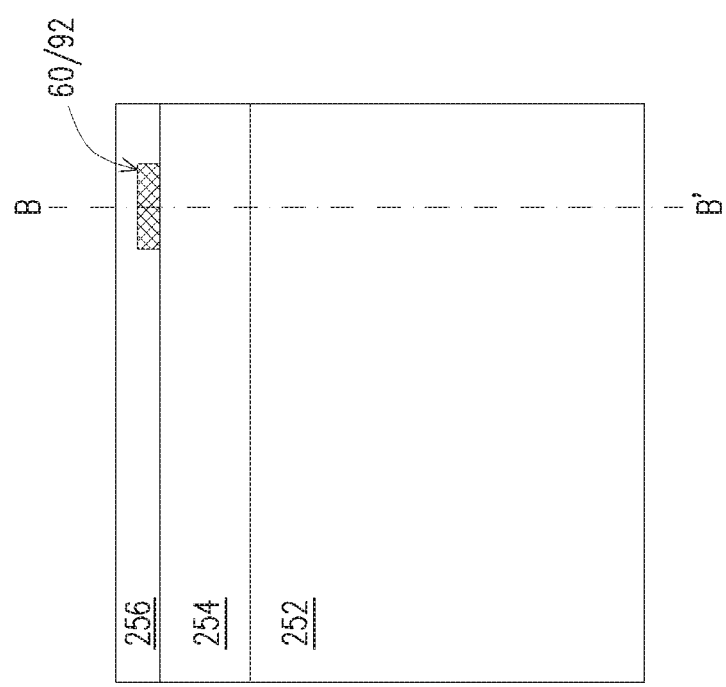
Figure 16E:
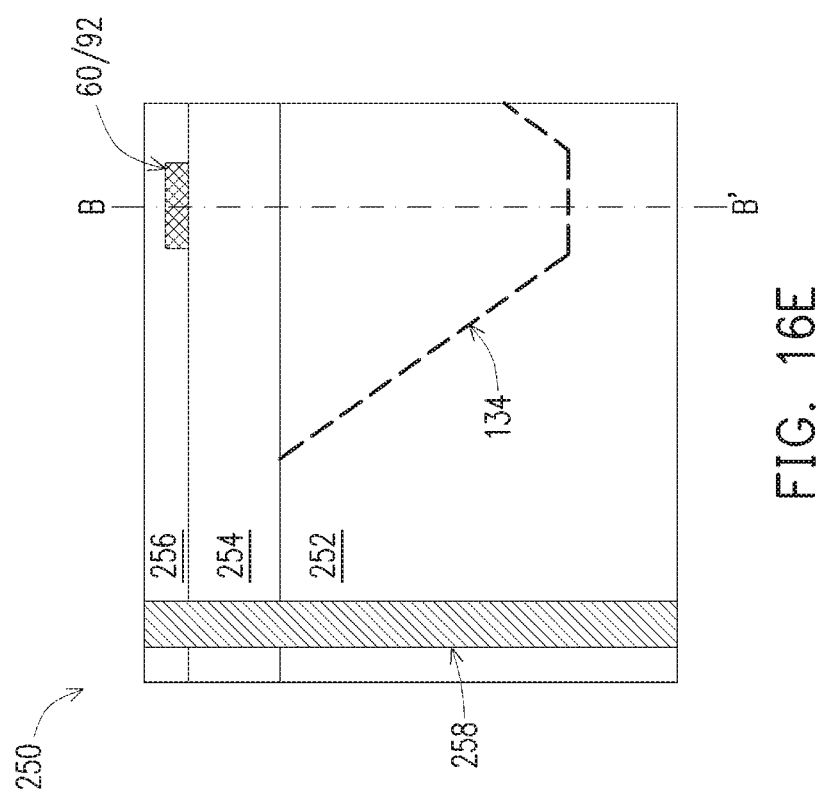
Figure 16G:
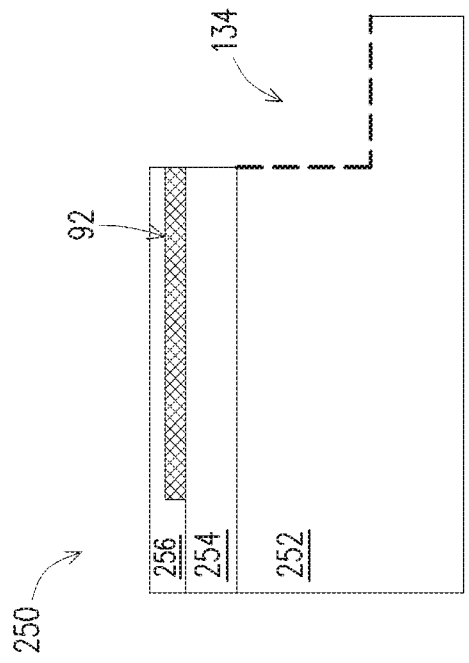
Figure 16F:
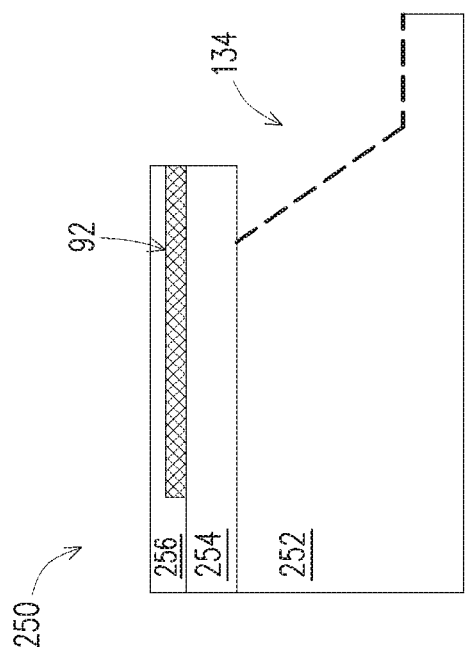
Figure 17:
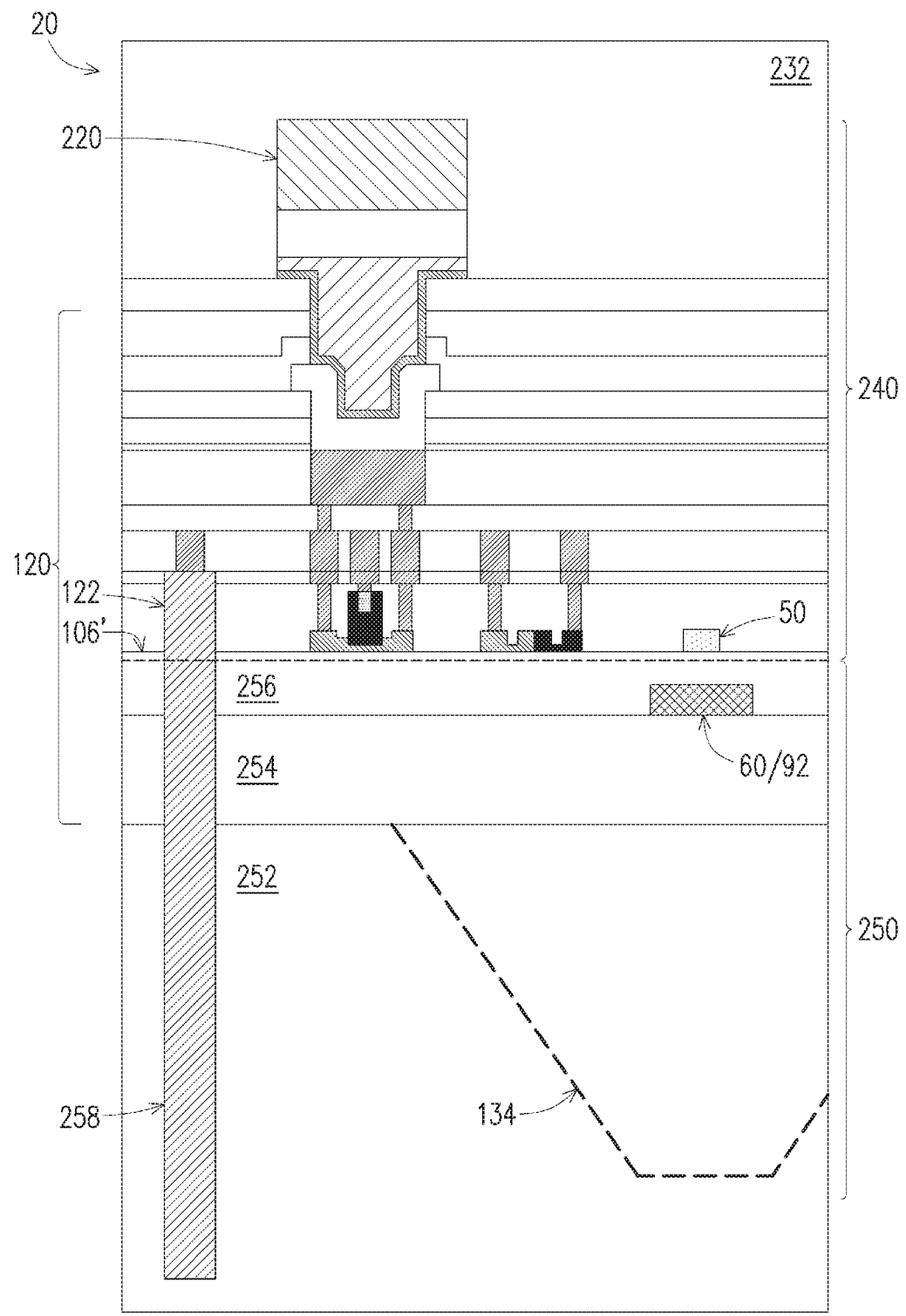

Turning now to FIGS. 15A through 19, embodiments are shown in which the silicon waveguides 50 and nitride waveguides 60 (including mode converters 80 or edge couplers 90) are formed separately in a first IPS structure 240 (see FIG. 15C) and a second IPS structure 250 (see FIG. 16G), which are and then bonded together to form an IPS 20 (see FIG. 17). In these embodiments, the nitride waveguides 60 may be located between the silicon waveguides 50 and the silicon substrate 104 in the IPS 20. The leakage between the silicon waveguides 50 and the silicon substrate 104 may be reduced due to the increased distance between the silicon waveguides 50 and the substrate 104. In this manner, an optical network 40 may be formed having the aforementioned benefits of nitride waveguides 60 while also having reduced optical signal loss without the formation of a cladding 70. The IPS 20 shown in FIG. 17 may be used in a photonics system such as photonics system 101 shown in FIG. 2, photonics system 103 shown in FIG. 5, or in other embodiment photonic systems described herein.

Figure 18:
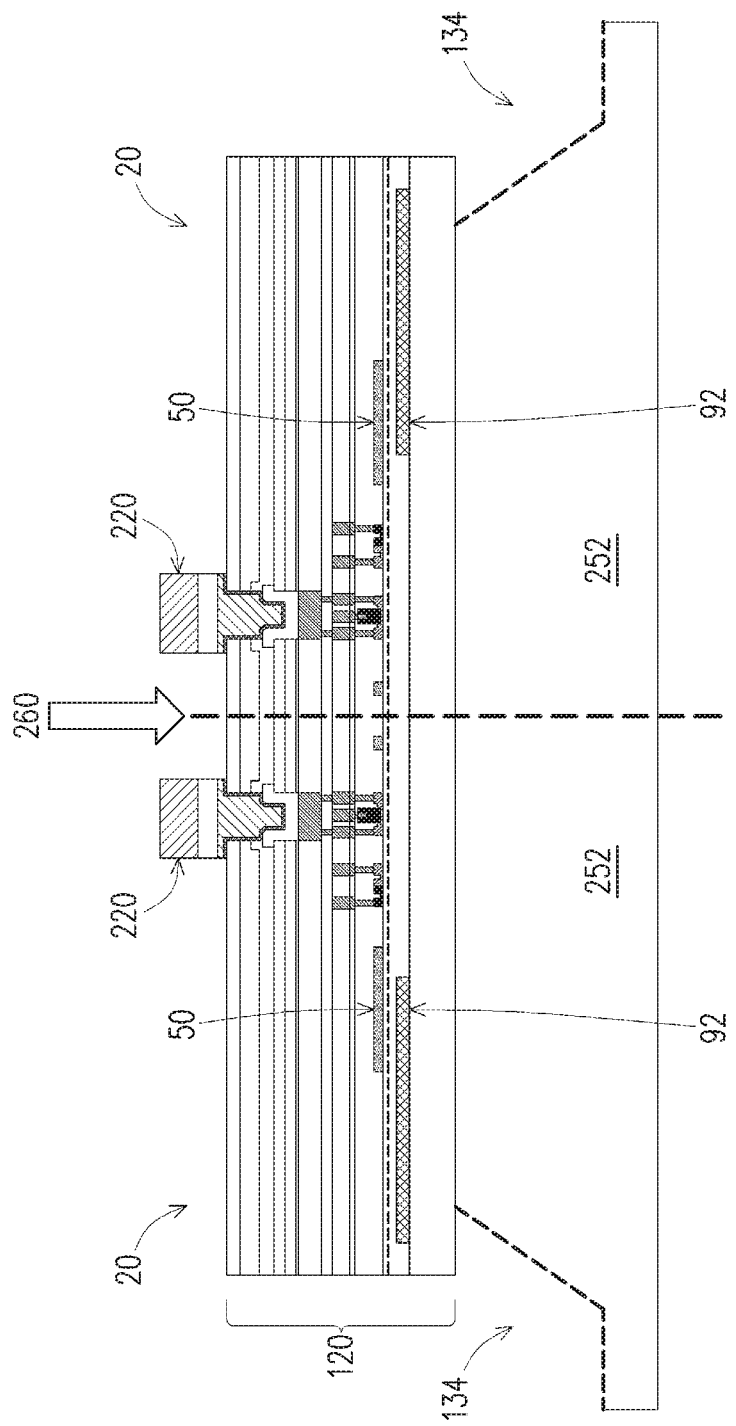

FIGS. 15A-15B show cross-sectional views of forming a first IPS structure 240, in accordance with some embodiments. The formation of the features shown in FIG. 15A-15B may be part of a Back End of Line (BEOL) process, in some embodiments. FIGS. 16A-16G show cross-sectional views of forming a second IPS structure 250, in accordance with some embodiments. FIGS. 16B, 16D, and 16F-16G show cross-sectional views of the cross-section B-B' as indicated in FIG. 16A. FIGS. 17-19 show cross-sectional views of forming an IPS 20, in accordance with some embodiments.

In FIG. 15A, an upper routing structure 123 is formed over a substrate 230. The upper routing structure 123 is part of the subsequently formed routing structure 120 (see FIG. 17, and also FIG. 2 or 5). In some embodiments, the upper routing structure 123 may be similar to the routing region 121 shown in FIG. 6E, and may be formed in a similar manner. For example, in some embodiments, the upper routing structure 123 shown in FIG. 15A may be formed over a BOX substrate similar to the BOX substrate 105 shown in FIG. 6A. A layer of silicon (e.g. silicon layer 108, see FIG. 6A) may be patterned to form silicon waveguides 50 and integrated photonic components such as photodetectors 154, modulators 156, grating couplers 152 (not shown in FIGS. 15A through 19) or other components. Conductive features 113 may then be formed over the silicon waveguides 50 and integrated photonic components 154/156, and conductive pads 115 are formed over the conductive features 113.

In FIG. 15B, conductive connectors 220 are formed over the conductive pads 115, and the upper routing structure 123 is attached to a carrier 232 (e.g., by an adhesive). In some embodiments, one or more dielectric layers 222 may be formed over the conductive pads 115 and then openings formed in the dielectric layers 222 to expose the conductive pads 115. The dielectric layers 222 may include one or more oxide layers, nitride layers, etch stop layers, passivation layers, the like, or combinations thereof. The dielectric layers 222 may be patterned using suitable photolithography and etching techniques.

In some embodiments, underbump metallization (UBM) 221 are formed on the conductive pads and dielectric layers 222. The UBM 221 may be formed by forming one or more conductive layers on the dielectric layers 222 and the conductive pads 115. The conductive layers may be formed using a suitable process, such as a plating process. The conductive layers may be formed from copper, a copper alloy, silver, titanium, gold, aluminum, nickel, the like, or combinations thereof. The conductive layers may then be patterned to form the UBM 221.

Conductive connectors 220 are then formed on the UBM 221. The conductive connectors 220 may be ball grid array (BGA) connectors, solder balls, metal pillars, controlled collapse chip connection (C4) bumps, micro bumps, electroless nickel-electroless palladium-immersion gold technique (ENEPIG) formed bumps, or the like. The conductive connectors 220 may include a conductive material such as solder, copper, aluminum, gold, nickel, silver, palladium, tin, the like, or a combination thereof. In some embodiments, the conductive connectors 220 are formed by initially forming a layer of solder through such commonly used methods such as evaporation, electroplating, printing, solder transfer, ball placement, or the like. Once a layer of solder has been formed on the structure, a reflow may be performed in order to shape the material into the desired bump shapes. In another embodiment, the conductive connectors 220 are metal pillars (such as a copper pillar) formed by a sputtering, printing, electro plating, electroless plating, CVD, or the like. The metal pillars may be solder free and have substantially vertical sidewalls. In some embodiments, a metal cap layer (not shown) is formed on the top of the conductive connectors 220. The metal cap layer may include nickel, tin, tin-lead, gold, silver, palladium, indium, nickel-palladium-gold, nickel-gold, the like, or a combination thereof and may be formed by a plating process.

In FIG. 15C, the substrate 104 is removed and the oxide layer 106 is thinned, forming the first IPS structure 240. The substrate 104 may be removed using a planarization process (e.g., a CMP or grinding process), an etching process, or a combination. The oxide layer 106 may be thinned using a planarization process, forming thinned oxide layer 106'. In some embodiments, the thinned oxide layer 106' may have a thickness between about 400 nm and about 600 nm.

Turning to FIGS. 16A-16G, the formation of the second IPS structure 250 is shown, in accordance with some embodiments. In FIGS. 16A-16B, an oxide layer 254 is formed over a substrate 252. The substrate 252 may be a material such as a glass, ceramic, dielectric, or a semiconductor substrate. For example, the substrate 252 may include a bulk semiconductor or the like, which may be doped (e.g., with a p-type or an n-type dopant) or undoped. In some embodiments, the substrate 252 is a wafer, such as a silicon wafer or other type of semiconductor wafer. Other substrate materials, such as a multi-layered or gradient substrate may also be used. In some embodiments, the material of the substrate 252 may include silicon, germanium, a compound semiconductor including silicon carbide, gallium arsenic, gallium phosphide, indium phosphide, indium arsenide, and/or indium antimonide, an alloy semiconductor including SiGe, GaAsP, AlInAs, AlGaAs, GaInAs, GaInP, and/or GaInAsP, the like, or combinations thereof. The oxide layer 254 may be, for example, a silicon oxide or the like. The oxide layer 254 may be formed by a high density plasma chemical vapor deposition (HDP-CVD), a flowable CVD (FCVD) (e.g., a CVD-based material deposition in a remote plasma system and post curing to make it convert to another material, such as an oxide), the like, or a combination thereof. In some embodiments, a planarization process (e.g., a CMP process) is performed on the oxide layer 254 after formation. In some embodiments, the oxide layer 254 may have a thickness between about 500 nm and about 2500 nm.

Still referring to FIGS. 16A-16B, a silicon nitride layer (not shown) is formed over the oxide layer 254 and patterned, forming nitride waveguides 60 and nitride couplers 92, wherein FIG. 16B is a cross-sectional view along the B-B' line of FIG. 16A. The silicon nitride layer may be patterned using acceptable photolithography and etching techniques. For example, a photoresist structure may be formed over the silicon nitride layer and patterned, and then the pattern transferred to the silicon nitride layer using an etching process to form nitride waveguides 60 and nitride couplers 92 (hereinafter sometimes referred to as "nitride features 60/92"). The etching process may include a dry etching process and/or a wet etching process, and the etching process may be selective to silicon nitride over silicon oxide, in some embodiments. The silicon nitride may be formed using a suitable deposition technique, such as CVD, LPCVD, PVD, or the like. In some embodiments, the nitride layer may be formed having a thickness between about 50 nm and about 500 nm.

In some cases, depositing the silicon nitride of the nitride features 60/92 using an LPCVD technique can reduce the propagation loss of the nitride features 60/92 (e.g. compared with other deposition techniques, such as PECVD). In some cases, the propagation loss of the nitride features 60/92 can be reduced by forming the silicon nitride using an LPCVD technique at a process temperature between about 600° C. and about 800° C. However, in some cases, temperatures in excess of about 400° C. can damage silicon photonic components, such as silicon waveguides 50, photodetectors 154, modulators 156, and the like (see FIGS. 15A-15C). Accordingly, by forming the nitride features 60/92 and the silicon photonic components on separate substrates, the nitride features 60/92 may be formed using deposition techniques that improve the performance of the nitride features 60/92 without risk of damage to silicon photonic components.

Turning to FIGS. 16C-16D, an oxide layer 256 is formed over the oxide layer 254 and the nitride features 60/92, wherein FIG. 16D is a cross-sectional view along the B-B' line of FIG. 16C. The oxide layer 256 may be formed from a material similar to the oxide layer 254, and may be formed in a similar manner. The oxide layer 256 may be planarized, using a CMP process or the like. In some embodiments, the oxide layer 256 may be formed having a thickness between about 55 nm and about 550 nm. In some embodiments, the thickness of the oxide layer 256 over the nitride features 60/92 may be between about 5 nm and about 50 nm.

Turning to FIGS. 16E-16G, vias 258 and a fiber trench 134 are formed in the substrate 252, forming second IPS structure 250. The vias 258 may be, for example, through vias (TVs) or the like, wherein FIGS. 16F-16G are a cross-sectional views along the B-B' line of FIG. 16E. The vias 258 may be formed to make electrical connection with the vias 122 when the first IPS structure 240 is bonded to the second IPS structure 250 (see FIG. 17). The vias 258 may be formed using similar materials or similar processes as the vias 122. For example, openings for the vias 258 are formed through oxide layers 256 and 254 and into the substrate 252 using acceptable photolithography and etching techniques. A conductive material may then be formed in the openings, forming vias 258. A planarization process, such as a CMP process, may be performed such that top surfaces of the vias 258 and oxide layer 256 are level.

Still referring to FIGS. 16E-16G, a fiber trench 134 is etched in the substrate 252. Prior to etching the fiber trench 134, the oxide layers 254/256 and the nitride coupler 92 may be patterned and etched (e.g., using suitable photolithography and etching techniques) such that a sidewall of the nitride coupler 92 is exposed. The fiber trench 134 may be formed by suitable photolithography and etching techniques. The etching process may include a dry etching process and/or a wet etching process, and the etching process may be selective to silicon over silicon oxide or silicon nitride, in some embodiments. The fiber trench 134 may have vertical or angled sidewalls, a flat bottom surface or a v-shaped bottom surface, or may have a different shape than these examples. In some embodiments, the etching process undercuts the oxide layer 254, as shown in FIG. 16F. The fiber trench 134 may undercut the oxide layer 254 a distance between about 40 μm and about 100 μm. In other embodiments, the etching process does not undercut the oxide layer 254, as shown in FIG. 16G. In some embodiments, more than one fiber trench 134 may be formed in the substrate 252.

Turning to FIG. 17, the first IPS structure 240 (see FIG. 15C) is bonded to the second IPS structure 250 (see FIG. 16E) to form an IPS 20 having a hybrid optical network, in accordance with some embodiments. The IPS 20 shown in FIG. 17 may be used in a photonics system such as photonics system 101 shown in FIG. 2, photonics system 103 shown in FIG. 5, or in other embodiment photonic systems described herein. The first IPS structure 240 may be bonded to the second IPS structure 250 using a suitable bonding technique, such as hybrid bonding, fusion bonding, direct bonding, dielectric bonding, metal bonding, or the like. For example, the thinned oxide layer 106' of the first IPS structure 240 may be bonded to the oxide layer 256 of the second IPS structure 250. Additionally, the vias 122 of the first IPS structure 240 may be bonded to the vias 258 of the second IPS structure 250 to form electrical connections between the first IPS structure 240 and the second IPS structure 250. Silicon waveguides 50 of the first IPS structure 240 may be aligned over corresponding nitride features 60/92 of the second IPS structure 250 to form the optical network 40 of the IPS 20. For example, an end of a nitride waveguide 60 (e.g., similar to that shown in FIG. 8A) may be aligned over an end of a silicon waveguide 50 (e.g., similar to that shown in FIG. 7A) to form a mode converter 80 within the IPS 20 after bonding. In this manner, the routing structure 120 of the IPS 20 is also formed. After bonding, the carrier 232 may be removed from the first IPS structure 240.

In some embodiments, multiple IPS s 20 may be formed and then singulated, as shown in FIG. 18. In some embodiments, multiple first IPS structures 240 may be bonded to multiple second IPS structures 250, and then a singulation process 260 performed to singulate individual IPSes 20. The singulation process 260 may include a suitable singulation process using a saw, a laser, or other techniques or combinations of techniques. After singulation, an optical fiber 140 may be mounted in the trench 134 and aligned with a nitride coupler 92, as shown in FIG. 19. The optical fiber 140 may be secured in place using an optical glue (not shown) or other suitable adhesive material.

In some cases, the use of an integrated optical network comprising both silicon and silicon nitride components can achieve advantages. For example, silicon nitride waveguides may have lower propagation loss than silicon waveguides, so the use of silicon nitride waveguides for transmitting optical signals between sites can improve signal strength and reduce power consumption used to compensate for signal loss. The silicon waveguides and silicon nitride waveguides can be coupled by forming coupling structures. Silicon nitride waveguides can be formed on a layer above silicon waveguides, and a cladding of silicon oxide surrounding the silicon nitride waveguides and the silicon waveguides can be formed. By having side surfaces and top surfaces of the cladding exposed to the atmosphere, signal loss due to optical coupling with the substrate can be reduced. Silicon nitride waveguides can be formed on a different substrate than the silicon waveguides, and then the silicon nitride waveguide structure and the silicon waveguide structure can be bonded together. The silicon nitride waveguides may be formed between the silicon waveguides and the substrate in this manner, which reduces coupling between the silicon waveguides and the substrate. Photonic systems using these techniques may be formed having photonic components integrated in separate dies or may be formed having photonic components integrated with the silicon waveguides.

In an embodiment, a method includes forming silicon waveguide sections in a first oxide layer over a substrate, the first oxide layer disposed on the substrate, forming a routing structure over the first oxide layer, the routing structure including one or more insulating layers and one or more conductive features in the one or more insulating layers, recessing regions of the routing structure, forming nitride waveguide sections in the recessed regions of the routing structure, wherein the nitride waveguide sections extend over the silicon waveguide sections, forming a second oxide layer over the nitride waveguide sections, and attaching semiconductor dies to the routing structure, the dies electrically connected to the conductive features. In an embodiment, the method further includes patterning the first oxide layer and the second oxide layer to form a cladding structure surrounding the silicon waveguide sections and the nitride waveguide sections, the cladding structure having exposed sidewalls. In an embodiment, the nitride waveguide sections are straight. In an embodiment, the method further includes forming a photonic device over the first oxide layer, wherein the photonic device includes silicon, and wherein the photonic device is optically coupled to at least one first waveguide section. In an embodiment, the photonic device includes a modulator. In an embodiment, the method further includes forming vias extending through the substrate, wherein the conductive features are electrically coupled to the vias. In an embodiment, at least one semiconductor die is an integrated photonic die. In an embodiment, at least one nitride waveguide section extends over an end portion of a silicon waveguide, the end portion having a tapered shape. In an embodiment, the method further includes forming an edge coupler over the first oxide layer, the edge coupler including silicon nitride, wherein a portion of the edge coupler extends over one of the silicon waveguide sections.

In an embodiment, a method includes forming a first photonic structure, including patterning a silicon layer on a first substrate to form a first set of waveguides, wherein the silicon layer is disposed on a first oxide layer, forming conductive features over the first set of waveguides, and removing the first substrate to expose the first oxide layer. The method also includes forming a second photonic structure, including depositing a silicon nitride layer on a second substrate, patterning the silicon nitride layer to form a second set of waveguides, and forming a second oxide layer over the second set of waveguides. The method also includes bonding the first photonic structure to the second photonic structure, wherein the first oxide layer is bonded to the second oxide layer, wherein the first set of waveguides is laterally aligned to the second set of waveguides. In an embodiment, the method further includes connecting a semiconductor die to the conductive features. In an embodiment, the method further includes patterning the silicon nitride layer to form an edge coupler and recessing the second oxide layer to expose a sidewall of the edge coupler. In an embodiment, the method further includes etching a trench in the second substrate adjacent the edge coupler, wherein the trench is configured to align an optical fiber with the edge coupler. In an embodiment, the method includes attaching the second photonic structure to an interconnect structure. In an embodiment, the method includes patterning the silicon layer to form photonic devices, the photonic devices optically coupled to the first set of waveguides. In an embodiment, the silicon nitride layer is deposited using a low-pressure chemical vapor deposition process including a process temperature of 700° C. to 850° C.

In an embodiment, a photonic device includes an integrated photonic structure, including multiple oxide layers over a substrate, multiple first waveguides and multiple second waveguides within the multiple oxide layers, wherein the multiple first waveguides are optically coupled to the multiple second waveguides, wherein the multiple first waveguides include silicon and the multiple second waveguides include silicon nitride, and a routing structure over at least a portion of a first waveguide of the multiple first waveguides, the routing structure including multiple insulating layers and multiple conductive features in the multiple insulating layers, and multiple semiconductor dies attached to the routing structure, wherein the multiple semiconductor dies are electrically coupled to the multiple conductive features. In an embodiment, the multiple first waveguides are closer to the substrate than the multiple second waveguides. In an embodiment, the photonic device includes a photodetector within the multiple oxide layers, the photodetector optically coupled to a first waveguide and electrically coupled to the multiple conductive features. In an embodiment, the photonic device includes a grating coupler within the multiple oxide layers, the grating coupler optically coupled to a first waveguide, and further including a photodetector within a semiconductor die, the photodetector configured to receive optical signals from the grating coupler.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
forming silicon waveguide sections in a first oxide layer over a substrate, the first oxide layer disposed on the substrate;
forming a routing structure over the first oxide layer, the routing structure comprising one or more insulating layers and one or more conductive features in the one or more insulating layers;
recessing regions of the routing structure;
forming nitride waveguide sections in the recessed regions of the routing structure, wherein the nitride waveguide sections extend over the silicon waveguide sections;
forming a second oxide layer over the nitride waveguide sections; and
attaching semiconductor dies to the routing structure, the dies electrically connected to the conductive features.

2. The method of claim 1, further comprising patterning the first oxide layer and the second oxide layer to form a cladding structure surrounding the silicon waveguide sections and the nitride waveguide sections, the cladding structure having exposed sidewalls.

3. The method of claim 1, wherein the nitride waveguide sections are straight.

4. The method of claim 1, further comprising forming a photonic device over the first oxide layer, wherein the photonic device comprises silicon, and wherein the photonic device is optically coupled to at least one first waveguide section.

5. The method of claim 4, wherein the photonic device comprises a modulator.

6. The method of claim 1, further comprising forming vias extending through the substrate, wherein the conductive features are electrically coupled to the vias.

7. The method of claim 1, wherein at least one semiconductor die is an integrated photonic die.

8. The method of claim 1, wherein at least one nitride waveguide section extends over an end portion of a silicon waveguide, the end portion having a tapered shape.

9. The method of claim 1, further comprising forming an edge coupler over the first oxide layer, the edge coupler comprising silicon nitride, wherein a portion of the edge coupler extends over one of the silicon waveguide sections.

10. A method, comprising:
forming a first photonic structure, comprising:
patterning a silicon layer on a first substrate to form a first set of waveguides, wherein the silicon layer is disposed on a first oxide layer;
forming conductive features over the first set of waveguides; and
removing the first substrate to expose the first oxide layer;
forming a second photonic structure, comprising:
depositing a silicon nitride layer on a second substrate;
patterning the silicon nitride layer to form a second set of waveguides; and
forming a second oxide layer over the second set of waveguides; and
bonding the first photonic structure to the second photonic structure, wherein the first oxide layer is bonded to the second oxide layer, wherein the first set of waveguides is laterally aligned to the second set of waveguides.

11. The method of claim 10, further comprising connecting a semiconductor die to the conductive features.

12. The method of claim 10, further comprising patterning the silicon nitride layer to form an edge coupler and recessing the second oxide layer to expose a sidewall of the edge coupler.

13. The method of claim 12, further comprising etching a trench in the second substrate adjacent the edge coupler, wherein the trench is configured to align an optical fiber with the edge coupler.

14. The method of claim 10, further comprising attaching the second photonic structure to an interconnect structure.

15. The method of claim 10, comprising patterning the silicon layer to form photonic devices, the photonic devices optically coupled to the first set of waveguides.

16. The method of claim 10, wherein the silicon nitride layer is deposited using a low-pressure chemical vapor deposition process comprising a process temperature of 700° C. to 850° C.

17. A photonic device, comprising:
an integrated photonic structure, comprising:
a plurality of oxide layers over a substrate;
a plurality of first waveguides and a plurality of second waveguides within the plurality of oxide layers, wherein the plurality of first waveguides is optically coupled to the plurality of second waveguides, wherein the plurality of first waveguides comprises silicon and the plurality of second waveguides comprises silicon nitride; and
a routing structure over at least a portion of a first waveguide of the plurality of first waveguides, the routing structure comprising a plurality of insulating layers and a plurality of conductive features in the plurality of insulating layers; and
a plurality of semiconductor dies attached to the routing structure, wherein the plurality of semiconductor dies are electrically coupled to the plurality of conductive features.

18. The photonic device of claim 17, wherein the plurality of first waveguides is closer to the substrate than the plurality of second waveguides.

19. The photonic device of claim 17, further comprising a photodetector within the plurality of oxide layers, the photodetector optically coupled to a first waveguide and electrically coupled to the plurality of conductive features.

20. The photonic device of claim 17, further comprising a grating coupler within the plurality of oxide layers, the grating coupler optically coupled to a first waveguide, and further comprising a photodetector within a semiconductor die, the photodetector configured to receive optical signals from the grating coupler.

* * * * *